United States Patent [19]

Badzinski et al.

[11] Patent Number: 4,458,693

[45] Date of Patent: Jul. 10, 1984

[54] MONITORING SYSTEM

[75] Inventors: John D. Badzinski, Coon Rapids; Michael A. Colson, Minneapolis; Dennis G. Hepp, Coon Rapids, all of Minn.

[73] Assignee: Medtronic, Inc., Minneapolis, Minn.

[21] Appl. No.: 243,229

[22] Filed: Mar. 13, 1981

[51] Int. Cl.³ .............................................. A61B 5/02
[52] U.S. Cl. ..................................... 128/715; 128/904
[58] Field of Search ................. 128/715, 773, 904; 174/2 A, 2 DB; 370/81, 85

[56] References Cited

U.S. PATENT DOCUMENTS

| | | | |
|---|---|---|---|
| 1,282,908 | 10/1918 | Miller . | |
| 3,171,406 | 3/1965 | Baum et al. | 128/2.05 |
| 3,181,528 | 5/1965 | Brackin | 128/2 |
| 3,182,129 | 5/1965 | Clark et al. | 179/1 |
| 3,245,403 | 4/1966 | Lieberman | 128/2 |
| 3,247,324 | 4/1966 | Cefaly et al. | 179/1 |
| 3,348,535 | 10/1967 | Gregg | 128/2.05 |
| 3,581,735 | 6/1971 | Gentner et al. | 128/2.05 T |
| 3,653,373 | 4/1972 | Batterman | 128/2 K |
| 3,767,859 | 10/1973 | Doering et al. | 179/2 A X |
| 3,773,033 | 11/1973 | Rodbard et al. | 128/2.06 |
| 3,799,147 | 3/1974 | Adolph et al. | 128/2.05 |
| 3,858,575 | 1/1975 | Rose | 128/2.05 |
| 3,878,832 | 4/1975 | Tickner et al. | 128/2.05 |
| 4,006,737 | 2/1977 | Cherry | 128/2.06 |
| 4,008,711 | 2/1977 | Olinger et al. | 128/2 K |
| 4,012,595 | 3/1977 | Ota | 370/81 |
| 4,048,444 | 9/1977 | Giampapa | 179/1 ST |
| 4,073,011 | 2/1978 | Cherry et al. | 364/900 |
| 4,093,821 | 6/1978 | Williamson | 179/1 SC |
| 4,100,377 | 7/1978 | Flanagan | 370/81 |
| 4,123,785 | 10/1978 | Cherry et al. | 360/6 |
| 4,124,773 | 11/1978 | Elkins | 179/2 DP X |
| 4,169,214 | 9/1979 | Stump | 370/81 |
| 4,195,626 | 4/1980 | Schweizer | 128/774 |
| 4,214,589 | 7/1980 | Sakamoto et al. | 128/680 |
| 4,220,160 | 9/1980 | Kimball et al. | 128/715 |
| 4,222,394 | 9/1980 | Nagashima et al. | 128/773 |
| 4,226,248 | 10/1980 | Manoli | 128/773 |
| 4,227,177 | 10/1980 | Moshier | 340/146.3 |
| 4,296,756 | 10/1981 | Dunning et al. | 128/904 X |
| 4,365,112 | 12/1982 | Ruether et al. | 370/81 X |
| 4,382,296 | 5/1983 | Joyce et al. | 370/81 |

FOREIGN PATENT DOCUMENTS

| | | | |
|---|---|---|---|
| 290303 | 12/1971 | U.S.S.R. | 128/773 |
| 454897 | 6/1975 | U.S.S.R. | 128/715 |
| 562267 | 8/1977 | U.S.S.R. | 128/715 |
| 641957 | 1/1979 | U.S.S.R. | 128/773 |

OTHER PUBLICATIONS

Bertrand, M. et al., "uP Application for Numerical ECG Encoding and Transmission", Proc. of the IEEE, vol. 65, #5, May 1977, pp. 714–721.

Van Mastrigt, R. et al., "Analog Data Collection via a Telephone Link: a uP-based Remote-Controlled Data-Acquisition System", MBEC, vol. 21, Mar. 1983, pp. 229-231.

"Sound Spectroanalytic Diagnosis of Malfunctioning Prosthetic Heart Valve," Y. Kagawa, S. Nitta, N. Satoh, K. Saji, Y. Shibota, T. Horiuchi, and M. Tanaka, Tohoku J. exp. Med., 123, 77–89.

"Real-time Sound Spectroanalysis for Diagnosis of Malfunctioning Prosthetic Valves," Y. Kagawa, N. Sato, S. Nitta, T. Hongo, M. Tanaka, H. Mohri, and T. Horiuchi, J. Thoracic Cardiovascular Surgery, 79:671–679, 1980.

"Ausculatation of Urinary Flow," William E. Bradley, Brian P. Brockway & Gerald W. Timm, The Journal of Urology, vol. 118, Jul., Part 1.

"Computer Analysis of Frequency Spectrum of a Phonothyreogram," K. J. Blinowska, M. A. Dzerminska, O. A. Chomicki, T. Gorowski, Med. & Biol. Eng. & Comput., 1979, 17, 207-210.

"An Electro-Acoustical Technique for the Detection of Knee Joint Noise," Mamerto L. Chu, Ivan A. Gradisar, Malsolm R. Railey and Gerald F. Bowling, Medical Research Engineering, vol. 12, No. 1, pp. 18–20.

Primary Examiner—Kyle L. Howell
Assistant Examiner—F. J. Jaworski
Attorney, Agent, or Firm—Robert J. Klepinski; John L. Rooney; Joseph F. Breimayer

[57] ABSTRACT

Apparatus and technique for monitoring physiological parameters. An acoustic sensor or microphone is placed in close proximity to the chest of a patient having one or two prosthetic heart valves. These heart valves produce clicks characteristic of opening and closing action. The acoustic sensor picks up the sound of these clicks and transfers them as electrical energy to a transmitter unit. The transmitter unit processes the analog signal, converts it to a digital signal and establishes the key timing factors involved. This digital data is stored in a memory buffer within the transmitter. Subsequently, this information is modulated and placed on telephone lines for transmission to a central monitoring site. At the monitoring site a demodulator returns the data to baseband digital signals. A computer at the central monitoring site displays the information in the time domain and also converts the information for display in the frequency domain.

7 Claims, 18 Drawing Figures

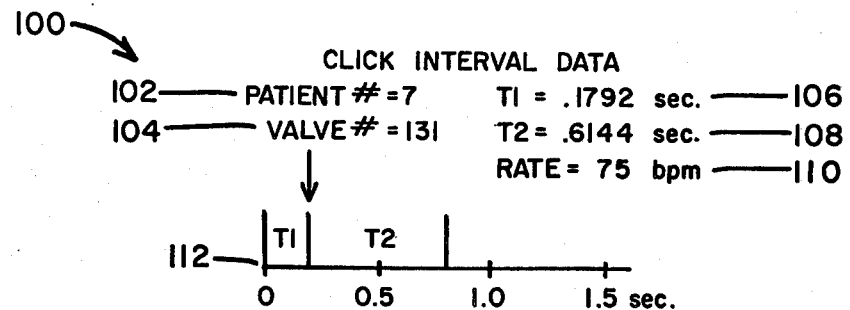
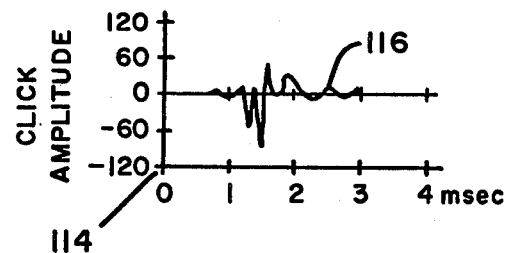
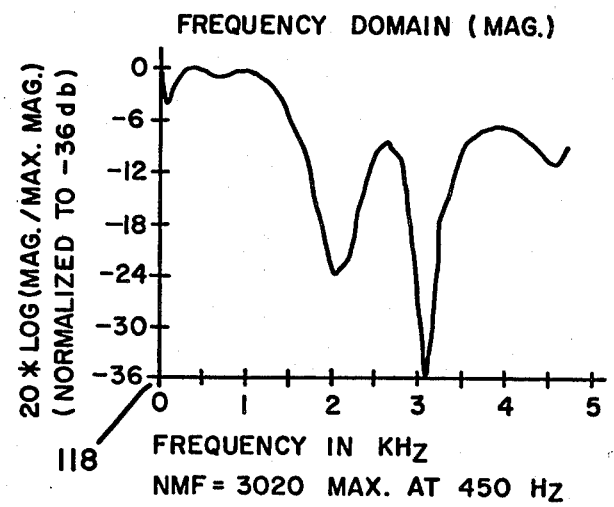
Fig. 2

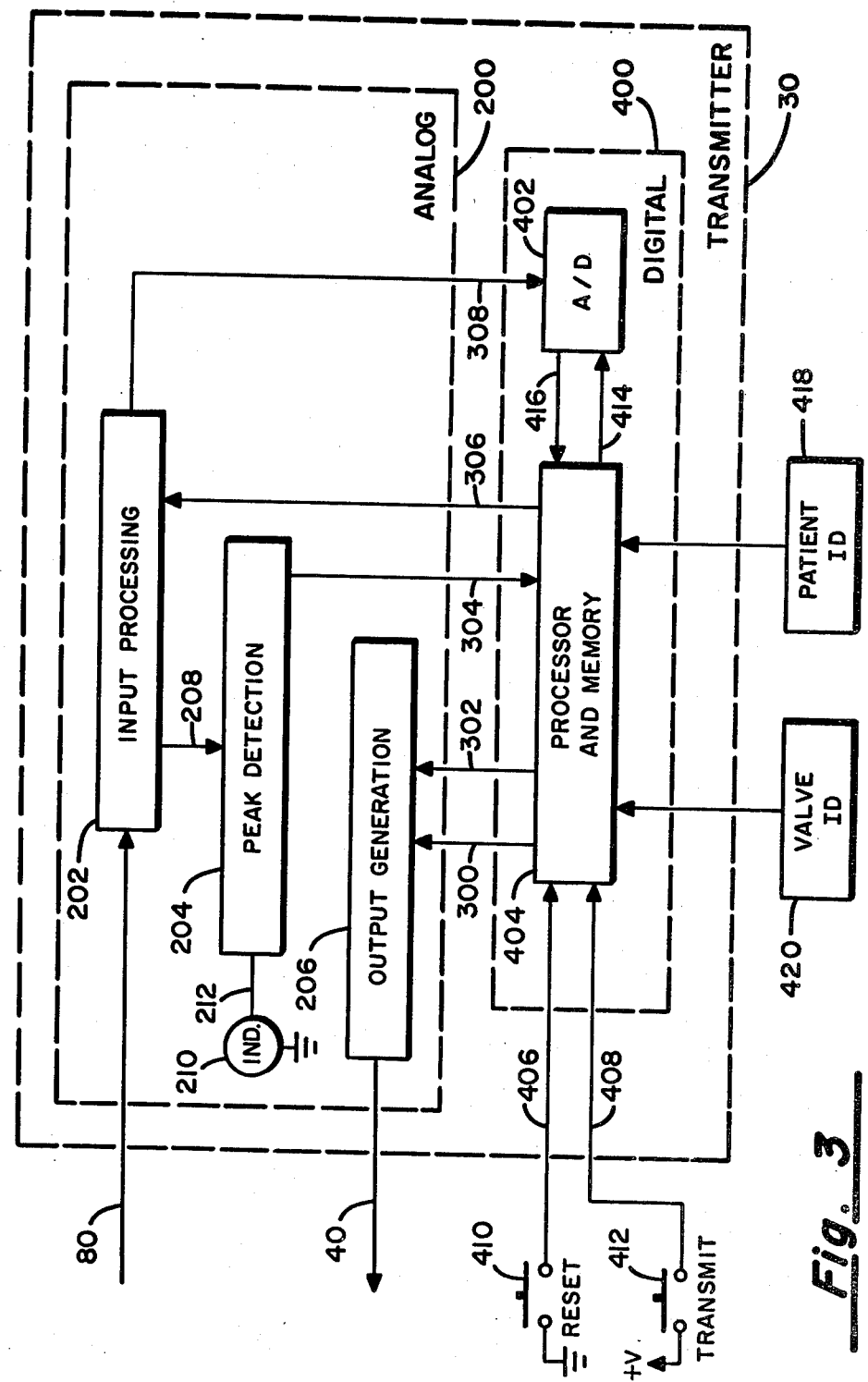

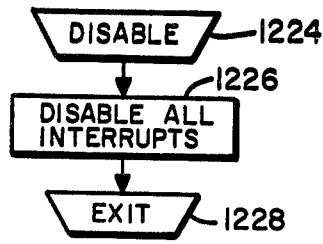
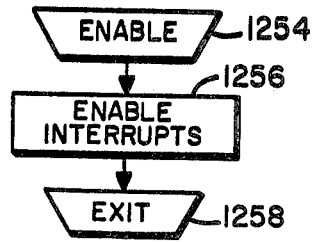
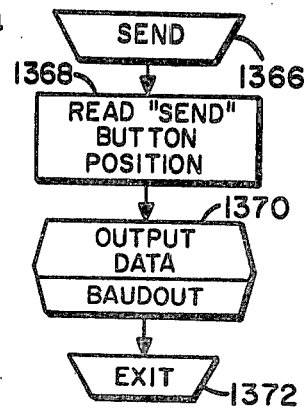
Fig. 10    Fig. 13    Fig. 15
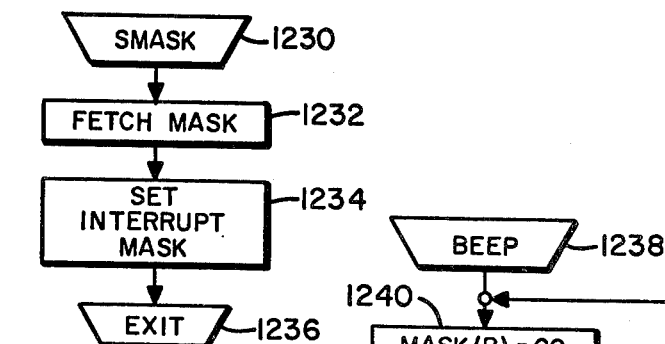
Fig. 11
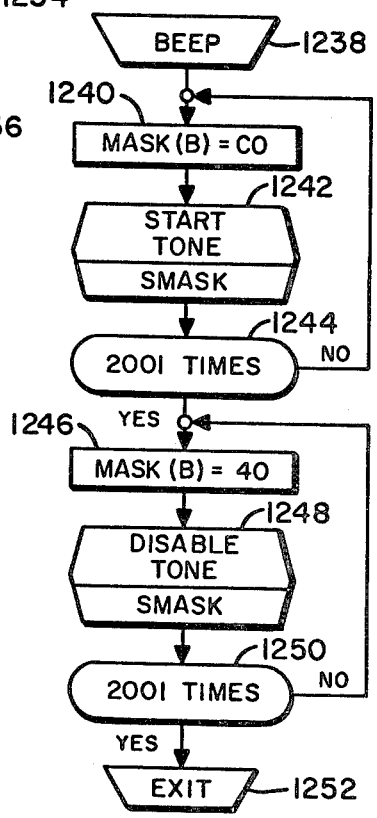
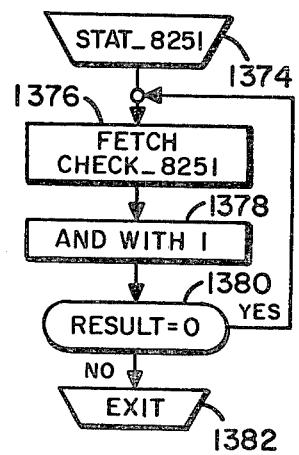
Fig. 17
Fig. 12

MONITORING SYSTEM

CROSS REFERENCE TO RELATED APPLICATIONS

BACKGROUND OF THE INVENTION

1. Field of the Invention

The present invention relates generally to monitoring equipment and more specifically relates to equipment for monitoring physiological parameters.

2. Description of the Prior Art

The monitoring of various physiological parameters is fairly common in the art. A typical example of a monitoring system may be seen in U.S. Pat. No. 3,799,147 issued to Adolph et al. This reference teaches a system for diagnosing myocardial infarction based upon the frequency response of EKG and acoustic signals. It is interesting to note that the techniques and apparatus used by Adolph et al are typical of what is currently in use in that the primary processing circuits operate in the time domain in analog fashion. A primary disadvantage of such a monitoring technique is that the signals to be monitored must be processed and monitored in real time—that is to say, must retain their relationship in the time domain. The effect of this is to increase the required bandpass of the equipment used and any communication link employed.

An example of a system measuring physiological parameters using digital data may be found in U.S. Pat. No. 4,214,589 issued to Sakamoto et al. This reference teaches the determination of blood pressure using measurements of pressure, Korotkov sound and other inputs. Upon examination of Sakamoto et al, however, one determines that the information that is digitized from the pressure detector is yet transmitted to the processing apparatus in relationship to the time domain. Again, as in the previous case, that requires that the bandpass of the system be sufficient to operate within real time.

Other examples of monitoring systems that employ digitized information having a relationship to real time may be found in such references as U.S. Pat. No. 4,006,737 issued to Cherry and U.S. Pat. No. 4,073,011 issued to Cherry, et al. Notice that in these references, the electrocardiographic computer disclosed speeds up real time such that EKG signals may be reviewed in much shorter time than the time required for gathering the data. In fact, a twenty-four hour tape of information may be processed in as short a time as twelve minutes. However, notice that the processing involved is yet related to real time, requiring relatively wide bandpasses to permit the handling of the information in true relationship to the time domain.

Probably the area in which physiological monitoring has reached its greatest degree of sophistication within the digital realm is in speech recognition. Though the speech to be processed may not be medical data in the truest sense of the word, yet using a very broad definition of physiological parameters, we can include speech. An example of a speech processing technique may be found in U.S. Pat. No. 4,227,177 issued to Moshier. Notice that the speech is input in an amplitude versus time domain signal and a corresponding truly digital signal is produced whose nature is that of text. The major difference, however, between this type of speech recognition and true monitoring for medical diagnostic purposes is that, though the speech is transformed into digital signals, the digital signals correspond only to what is said and not how it was said. That is to say, the effects of the time domain are totally excluded during the transformation process.

An interesting technique for attempting to recognize emotional state of a person from speech may be found in U.S. Pat. No. 4,093,821 issued to Williamson. Notice that in Williamson an attempt is made to analyze the signals within the time domain to determine the emotional state of the person applying the input. This technique being suitable to accomplish the purposes stated in the reference is probably not sufficiently accurate, nor precise enough, for medical purposes.

An example of a system which records information—in this case—in an analog format, and time tags that information to enable reconstruction of the time domain is found in U.S. Pat. No. 4,123,785 issued to Cherry, et al. This references teaches the use of a portable recorder for recording EKG information which also records a separate time mark to enable the monitoring and analysis apparatus to reconstruct that time domain for the purposes of providing its analysis and output. Notice, however, that the information that is recorded on the portable monitoring device is actually recorded as an analog signal.

The actual parameter chosen by the inventors to be monitored by the system disclosed herein is the audio click produced by the operation of a prosthetic heart valve. It has been shown in the art that such devices emit signals having specific frequency components. Subsequent embolotic buildup on these prosthetic heart valves tends to change the characteristic frequency components of the clicks. A first publication showing this effect is entitled "Sound Spectro Analytic Diagnosis of Malfunctioning Prosthetic Heart Valve" by Kagawa, et al in a paper originally delivered at the Sixtieth Anniversary of the First Department of Surgery, Tohoku University School of Medicine and subsequently published in Experimental Medicine, Vol. 123, pp. 77–89, 1977. Notice that, whereas Kagawa, et al provides some theoretical basis for the monitoring disclosed herein, they provide no practical apparatus for technique for performing this monitoring.

A second reference providing a theoretical basis for this type of monitoring is found in an article "Real Time Sound Spectro Analysis for Diagnosis of Malfunctioning Prosthetic Heart Valves," by Kagawa, et al published in the Journal of Thoracic Cardiovascular Surgery, Vol. 79, pp. 671–679, 1980. In this later article, apparatus is shown at FIG. 1 for processing of this click information. Notice, however, that the processing is accomplished essentially in real time and occurs primarily in the time domain in analog form. Again, this subsequent article provides theoretical basis for the type of monitoring disclosed herein, but does not show hardware for a practical accomplishment of these monitoring objectives.

SUMMARY OF THE INVENTION

The present invention provides apparatus and a technique for monitoring physiological parameters. This monitoring is accomplished by digitization and time-tagging of the input signals. Whereas digitization is important for the efficient further processing of the information, it is very important to note that the time-tagging provides a means for no longer adhering to the time domain when processing and communicating the data. After digitization the information is stored within a digital memory and is later communicated via communication lines to a centralized monitoring computer. Because the data is in true digital format at that point in time, great flexibility exists for the selection of various bandpasses for the transmission of the data. For example, the data may be transmitted over the communication link faster than the real time in which it was gathered or slower, depending upon the availability of communication bandwidth.

The data gathered in the system disclosed herein is the acoustic click characteristic of the operation of a prosthetic heart valve. This acoustic data is immediately converted to digital information and stored in a temporary memory. During the gathering of the information, the real time is windowed such that only the time period of interest—that is, the time in which the click occurs—is actually recorded and no information is recorded corresponding to the time period between clicks other than to record that time interval as a digital quantity.

The central monitoring computer receives the information and displays it for the attending physician. The information is displayed in four different ways. The information corresponding to patient ID, valve ID, and various time intervals are displayed directly as numerical quantities. The time intervals between clicks are also diagrammed. The click acoustic information is displayed in the time domain by reconstruction of the analog signal as received. The fourth display technique is to perform a fast fourier transform upon the data to display the click signal in the frequency domain. Using these four display techniques, it is felt that the physician at the central monitoring site is readily able to determine the presence of embolotic buildup on the prosthetic heart valve of a given patient and begin remedial therapy. Notice that this monitoring occurs in a manner very convenient to both patient and attending physician.

BRIEF DESCRIPTION OF THE DRAWINGS

FIG. 2 shows the data displays supplied to the attending physician at the central monitoring site.

FIG. 3 is a block diagram of transmitter 30.

FIG. 10 is a flowchart of subroutine DISABLE.

FIG. 11 is a flowchart of subroutine SMASK.

FIG. 12 is a flowchart of subroutine BEEP.

FIG. 13 is a flowchart of subroutine ENABLE.

FIG. 15 is a flowchart of subroutine SEND.

FIG. 17 is a flowchart of subroutine SEND and subroutine STAT_8251.

DETAILED DESCRIPTION OF THE PREFERRED EMBODIMENT

The present invention is described in terms of a product specifically designed for transtelephonic monitoring of the characteristic clicks of prosthetic heart valves. Those of ordinary skill in the art will be readily able to apply the invention described herein to other types of monitoring systems used in different configurations for measuring different physiological parameters.

SYSTEM

Figure 1:
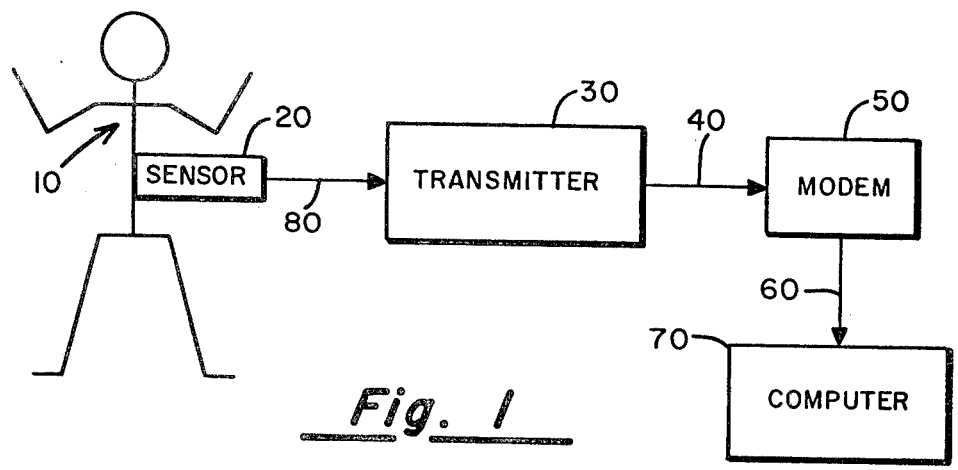
FIG. 1 is an overall system diagram showing the major elements of the system disclosed.

FIG. 1 is an overall block diagram of the prosthetic heart valve monitoring system. Patient 10 has previously had the implant of one or two prosthetic heart valves. Sensor 20 is an acoustic sensor for producing electrical signals in response to the received acoustic signals. Sensor 20 is probably a high quality microphone-like device. The electrical output of sensor 20 is transferred to transmitter 30 via cable 80. Transmitter 30 digitizes the information and stores it ready for transmission to the centralized monitoring site. Transmission of the data is via telephonic link 40. This link probably includes both landline and RF communication link segments. At the centralized monitoring site, MODEM 50 demodulates the signal and transfers it via I/O cable 60 to centralized monitoring computer 70.

Computer 70 is an off-the-shelf computing device. In the preferred embodiment, computer 70 is a Hewlett-Packard ® Model HP-85 computer system. The hardware required for this device is ordered with the built-in tape and printer. Options available that are required for this application are one 16K RAM Module, the I/O ROM, the HP-82939A Serial Interface, and the standard HP-85 software package. Subsequent discussions will describe the software required for computer 70. However, no additional discussion of computer 70 hardware is deemed necessary because it is an off-the-shelf device which is readily available.

MODEM 50 is also an off-the-shelf hardware device. In this system, it is produced by Novation Corporation and is a Model CAT. The preferred transmission mode, as will become apparent later on, is via 300 baud transmission over telephonic line 40. The interface between MODEM 50 and computer 70 is RS-232.

FIG. 2 is a representation of the data as displayed at computer 70 for the attending physician. Collectively, the output data is considered output 100. Output 100 includes certain tabular data and graphs 112, 114 and 118.

The tabular data contains a patient ID number 102 and valve ID number 104. These numbers are entered on manual switches of the transmitter by the physician prior to sensing and transmission of the information. The exact generation of the signals will become apparent in the subsequent discussion of the operation of transmitter 30. Time intervals T1, reference 106, and T2, reference 108, are the time intervals during the click and between clicks respectively. For those patients with two prosthetic heart valves, it is important to note the time interval between the click produced by a first prosthetic heart valve and the click produced by a second to verify that the desired click has been selected by the transmitter. The heart rate is also displayed as rate 110.

Graph 112 actually displays the time intervals T1 and T2 for a patient having a single valve. These are shown along a reconstructed timeline.

Graph 114 shows the click signal as received and presents it along a reconstructed timeline. Notice that the signal trace 116 is normalized about a 0 click amplitude. This normalization is desirable to correct for various aplitude variations between patients and between monitoring events.

The third graph is graph 118. It is a graph of amplitude versus frequency, and presents the click information after the performance of a fast fourier transform. It is felt, based on the theoretical papers referenced above, that the graph 118 may in fact have the most significance for diagnostic purposes, since it is anticipated that embolotic buildup will result in shifts of various frequency components which can be readily viewed from a comparison of graph 118 from one monitoring event to another.

TRANSMITTER 30 HARDWARE

FIG. 3 is a block diagram of transmitter 30. Notice that it contains two major elements. Analog 200 contains the analog circuitry of transmitter 30 and digital 400 contains the digital circuitry. The analog acoustic signal is received from sensor 20 via cable 80 (see also FIG. 1). The acoustic information is processed by input processing 202 and supplied to A/D 402 at which point it is converted to a digital format. A second output of input processing 202 is the supplying of an analog signal to peak detection 204. Peak detection 204 supplies an interupt to processor and memory 404 via line 304 as a result of analog peaks detected. Peak detection 204 also drives lamp IND210 via line 212 to provide the patient with a visually sensible indication of detection of the clicks. Cable 306 is used to enable processor and memory 404 to control the analog gain of input processing 202.

Processor and memory 404 controls operation of transmitter 30. Processor and memory 404 is reset by reset button 410 connected via line 406. Reset 410 enables the patient to reset processor and memory 404 and thereby reinitiate the monitoring process. The patient has a second pushbutton, transmit 412. This button connects a positive voltage via line 408 to processor and memory 404 and signifies when transmission of the data is to occur over the transtelephonic communication path. The physician presets the patient's unique patient ID via Patient ID 418 and his unique valve ID via Valve ID 420 prior to supplying the patient with the transmitter. Patient ID 418 and Valve ID 420 are switches providing eight-bit entry for each function.

Processor and memory 404 controls A/D 402 via cable 414. Actually, cable 414 is shown to enable one to conceptualize the control scheme. In practice, as will be seen from the detailed schematic diagrams discussed in relation to FIG. 5, it will be noted that cable 414 is actually the normal memory bus which processor and memory 404 uses for internal communication within digital 400. The output of processor and memory 404 is via lines 300 and 302 which drive output generation 206. Output generation 206 is actually a MODEM which supplies the modulated signal to transtelephonic line 40, probably via an acoustic coupler to a normal telephone handset. Lines 300 and 302 allow processor and memory 404 to provide the data and squelch signals, respectively.

Figure 4:
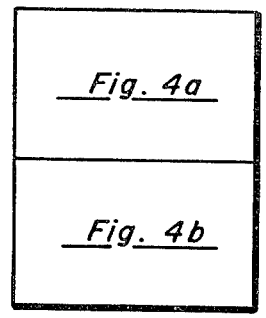
FIG. 4 is a circuit diagram of analog 200.

FIG. 4 is a detailed schematic presentation of analog 200. For the convenience of the reader, the three major segments of analog 200 are shown. One can see that the circuitry of input processing 202, peak detection 204, and output generation 206 are relatively independent. The internal power supply is shown as part of output generation 202. It consists of input filter capacitor 350, converter 348, and regulator 354. These elements are considered standard in the art and will not be discussed at any great length. It is only sufficient that input capacitor 350 be a large electrolytic capacitor to provide sufficient filtering, converter CONV348 be a DC-to-DC converter providing negative nine volt output 352 from positive 5 volts designated +V, and regulator 354 supply regulated +5 voltage at line 356. From a nine volt battery supply, Zener diode 347 provides a regulated −5 volts, the reference voltage for A/D 402. As shown throughout, the +5 volts is shown as +V, in each case, and the +9 volts is shown as stated.

Sensor 20 is as stated before, probably a high quality microphone. It is connected to ground at one side and to operational amplifier 218 via line 80 and input coupling capacitor 214. Load resistor 216 has a value of 10k ohms and input coupling capacitor 214 has a value of 0.012 microfarads. The feedback network for operational amplifier 218 consists of resistor 222, having a value of 15k ohms and capacitor 220 having a value of 0.01 microfarads.

The output of operational amplifier 218 is coupled via line 224 to 50 or 60 hertz filter 226 depending upon the country of use. 50 or 60 hertz filter 226 is a notch filter whose sole purpose is to remove the 50 or 60 hertz line frequency present in most electrically active environments. The output of 50 or 60 hertz filter 226 is coupled via 200k ohm resistor 228 to operational amplifier 234. The positive input of operational amplifier 234 is connected to ground via 200k ohm resistor 236. The feedback network present consists of 1.6 megohm resistor 232 and 10 picofarad capacitor 230. The output of operational amplifier 234 is supplied to a gain control gain 244 and also to peak detection 204. Coupling to gain 244 is via 0.1 microfarad capacitor 242. Coupling to peak detection 204 is via 100k ohm resistor 238 and line 208. Diode 240 is a type 1N4148 which is used to clamp the input to peak detection 204.

Gain 244 is a standard digitally controlled analog gain circuit. Part type 7523 is typical of the circuit used. The digital gain control input is via cable 306, (see also FIG. 3). The analog input is, of course, received by pin 15 and output is via pin 8. Zener diode 246 clamps the output as received by operational amplifier 350. Feedback is supplied by 100k ohm resistor 248.

The output of operational amplifier 250 is supplied to operational amplifier 262 via 15k ohm resistor 252. The feedback network for operational amplifier 262 is provided by 68k ohm resistor 260 and 220 picofarad capacitor 258. Offset is supplied by potentiometer 254, which is a 50k ohm potentiometer connected between the +V and −V of the power supply. The positive input of operational amplifier 262 is grounded through 12k ohm resistor 264. The output of operational amplifier 262 is supplied to A/D 402, located within digital 400 via line 308 (see also FIG. 3).

The purpose of peak detection 204 is to generate an interrupt to processor and memory 404 via line 304 as a result of detecting a peak during a click. Visual feedback is also supplied to the patient via IND210. The analog input to peak detection 204 is via line 208 as discussed above. This is input to operational amplifier 266. The negative input of operational amplifier 266 is biased by 9.10k ohm resistor 265, and 100 ohm resistor 267. The output of operational amplifier 266 is capacitively coupled to one-shot 274 via capacitor 268. The output is clamped via diode 270 as well. One-shot 274 and one-shot 280 are respective portions of a dual one-shot type 4098. The one-shot timing is generated by the value of RC in each case. In the case of one-shot 274, a capacitor 278 having a value of 0.0022 microfarad, and resistor 276, having a value of 2 megohm provide a pulse width of about 5 milliseconds. This 5 millisecond signal is supplied to one-shot 280, which has a pulse width output established by 15 megohm resistor 284 and 0.0047 microfarad capacitor 282. This provides an output pulse width of approximately 70 milliseconds.

One output of one-shot 274 is also used to provide patient feedback via IND 210. This is provided by coupling diode 294 type 1N4148. Capacitor 296 has a value of 0.1 microfarad and resistor 298 has a value of 10 megohm. IND210 is an LED device which is driven by operational amplifier 311.

The 70 millisecond output pulse of one-shot 280 is used to generate an interrupt to processor and memory 404. The actual interrupt is generated by operational amplifier 292 which drives line 304. Resistor 286 has a value of 2.7k ohms and resistor 290 has a value of 2.2k ohms. The 70 millisecond output of one-shot 280 is not critical but must be sufficiently long to provide the 6.5 interrupt required by the INTEL 8085 microprocessor as discussed in more detail below.

As stated above, output generation 206 is essentially a MODEM for modulating the digitally received RS232 signal onto a carrier which is suitable for transmission via the telephonic link. The heart of the system is chip MOD1 330 which is the 1170/2125 hertz FSK modulator. This chip receives the RS232 input via pin 6. The preferred chip type for MOD1 330 is Cermetek, Inc. Model CH1224 being a standard chip type. Resistors 336, 338, 340, 342 and 344 have values of 66.5k ohm, 2k ohm, 66.5k ohm, 19.6k ohm and 19.6k ohm, respectively. Resistors 326 and 238 have values of 2k ohm and 4.7 megohm respectively. The coarse squelch circuit consists of 10k ohm resistor 332 and 20k ohm adjustable resistor 334.

The input to MOD1 330 is provided by operational amplifier 346. The major input to operational amplifier 346 is via the line 302 which is driven directly by processor and memory 404 as is discussed in more detail below. The output of MOD1 330 is to pin 15 of MOD2 322. MOD2 322 is standard chip type Cermetek, Inc. Model CH1262 being a dual channel FSK transmit filter/line hybrid/squelch for 1170 and 2125 hertz. Resistor 324 has a value of 68k ohms. The output volume is adjusted by resistor 316 having a value of 10k ohms. The output is capacitively coupled to the cable 40 via 0.022 microfarad capacitor 320. In practice, a speaker is used as shown which is acoustically coupled to the transmitter portion of a standard telephone handset. This permits the patient to readily transmit the information over his standard telephone.

Squelch control is also provided by operational amplifier 318 to enable processor and memory 404 to control all transmissions. This enables processor and memory 404 to generate the protocol information required for synchronization of the transmission. The input to operational amplifier 318 is via diode 314. Operational amplifier 312 is coupled to processor and memory 404 via line 300 and is driven in the manner described below.

Figure 5:
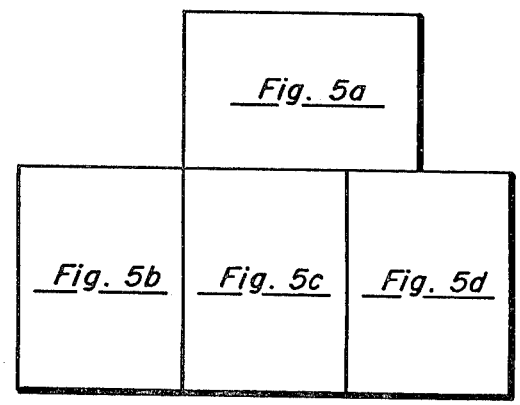
FIG. 5 is a circuit diagram of digital 400.
Figure 4A:
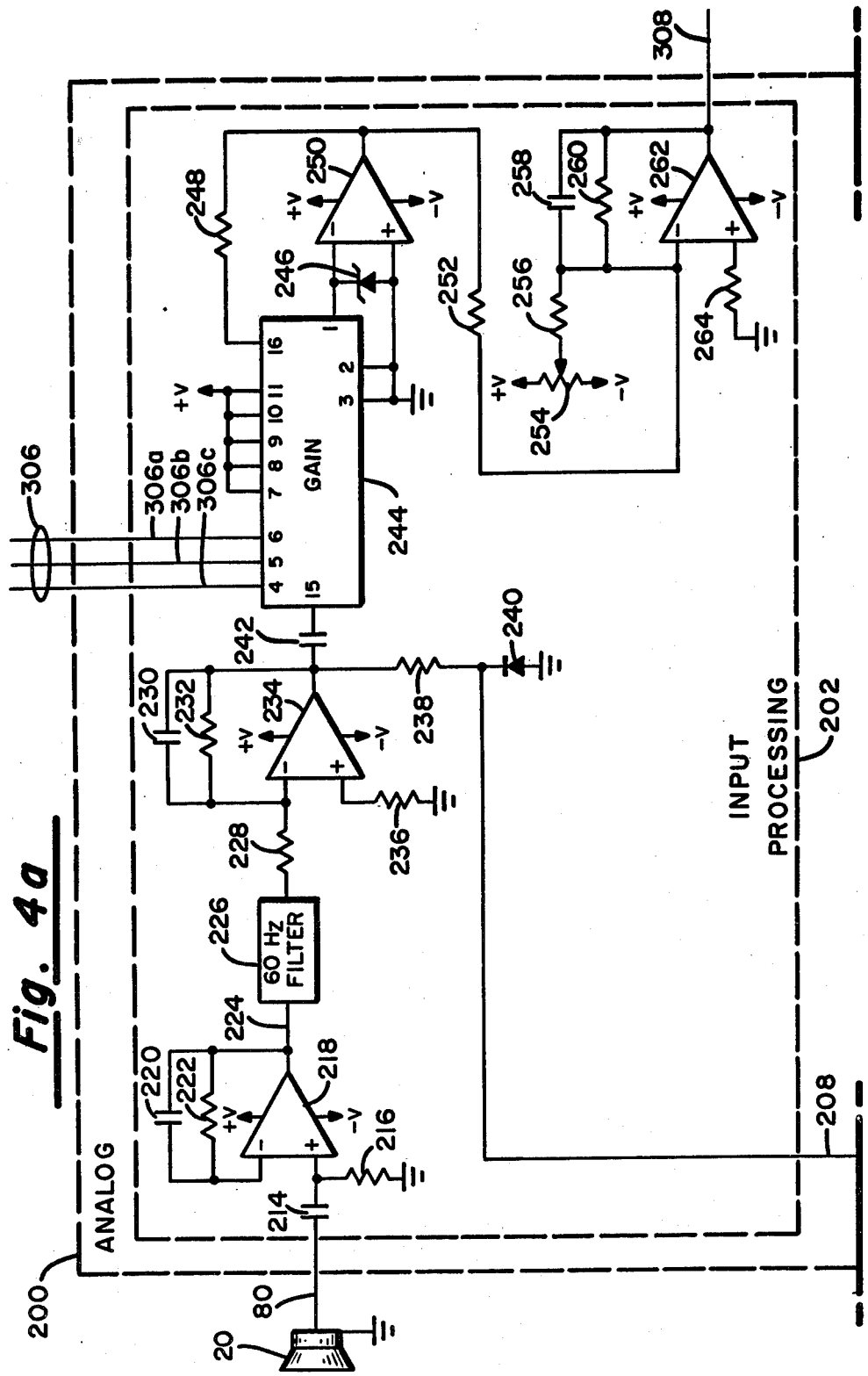
Figure 4B:
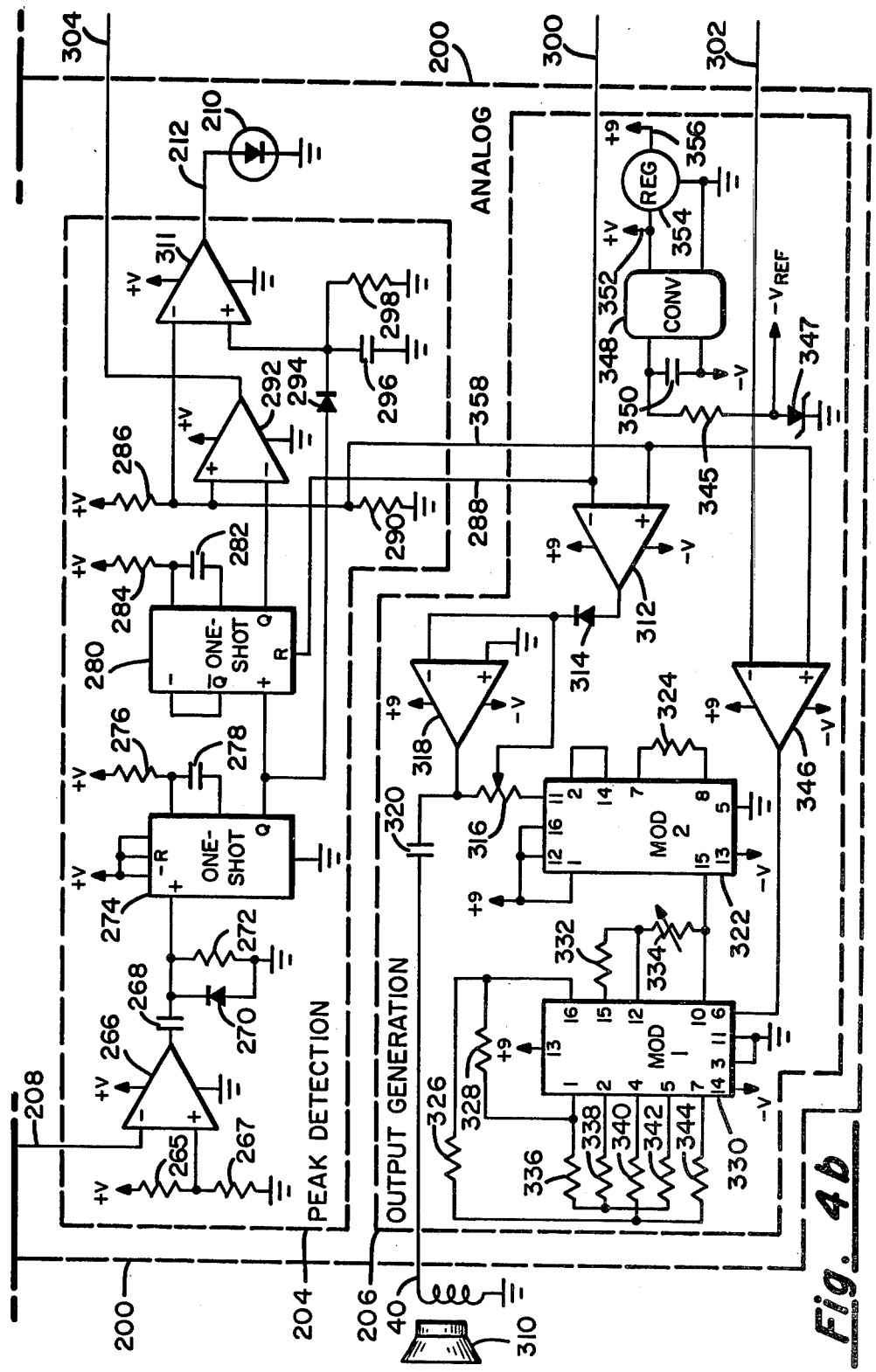
Figure 5A:
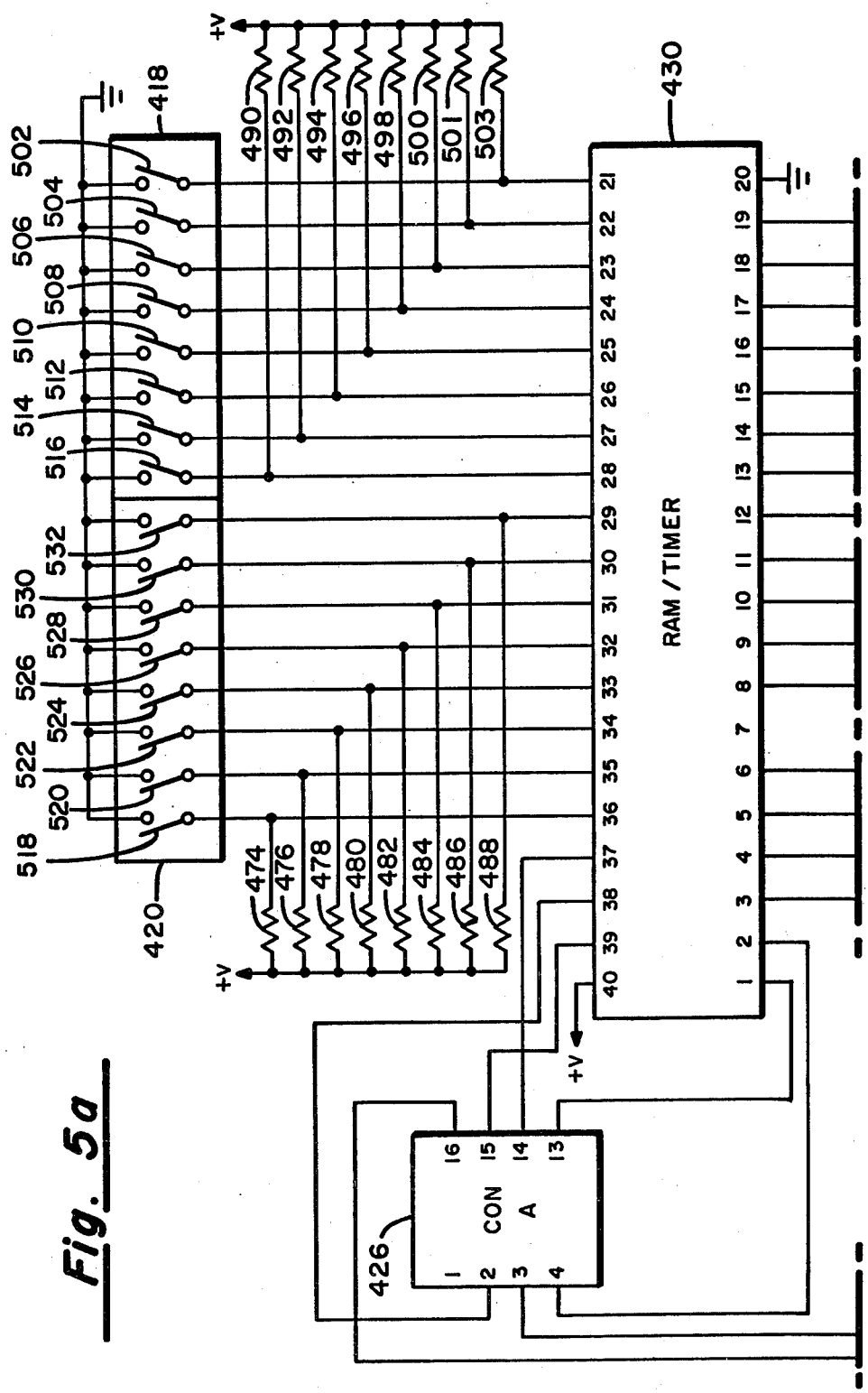
Figure 5B:
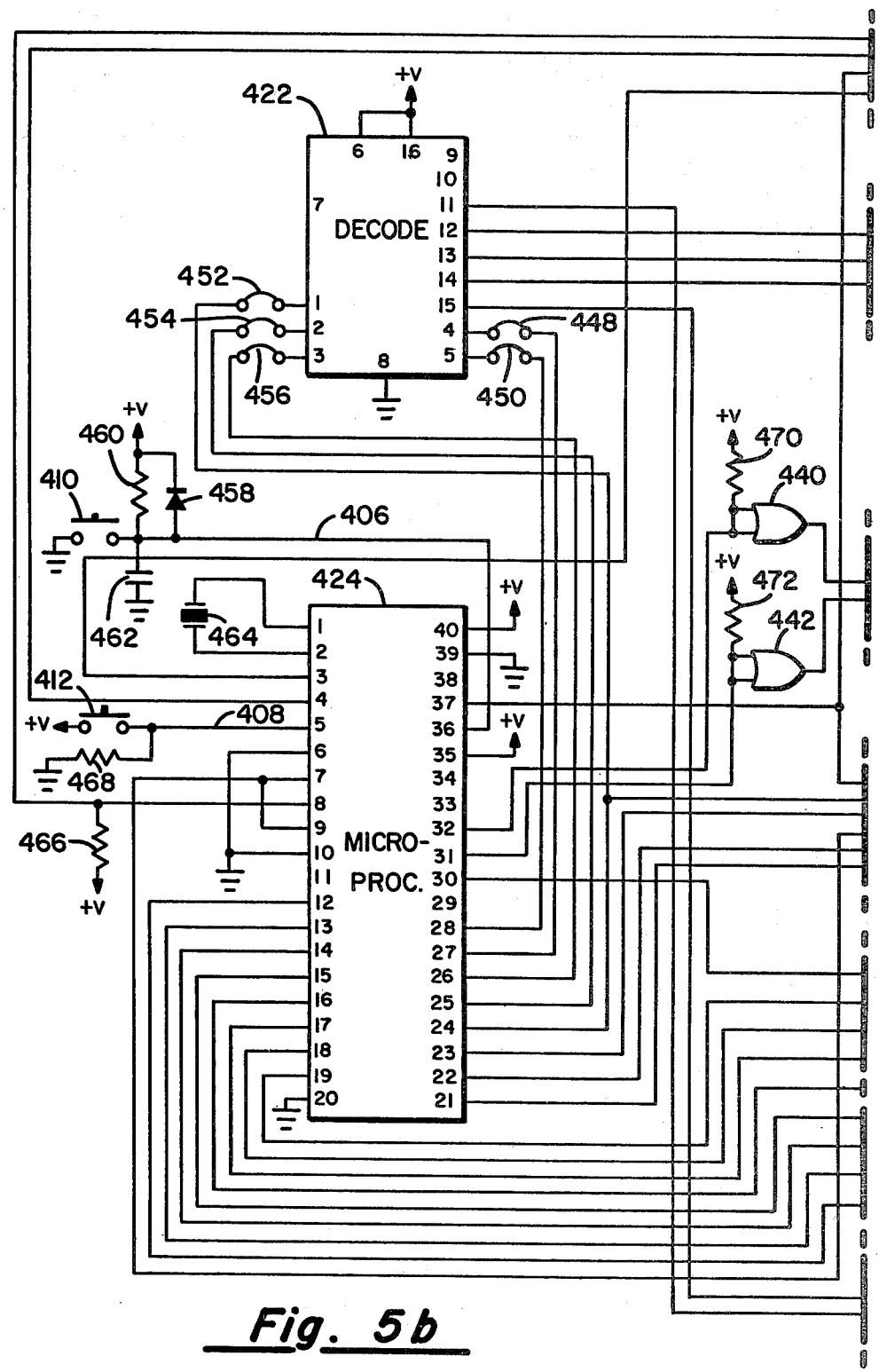
Figure 5C:
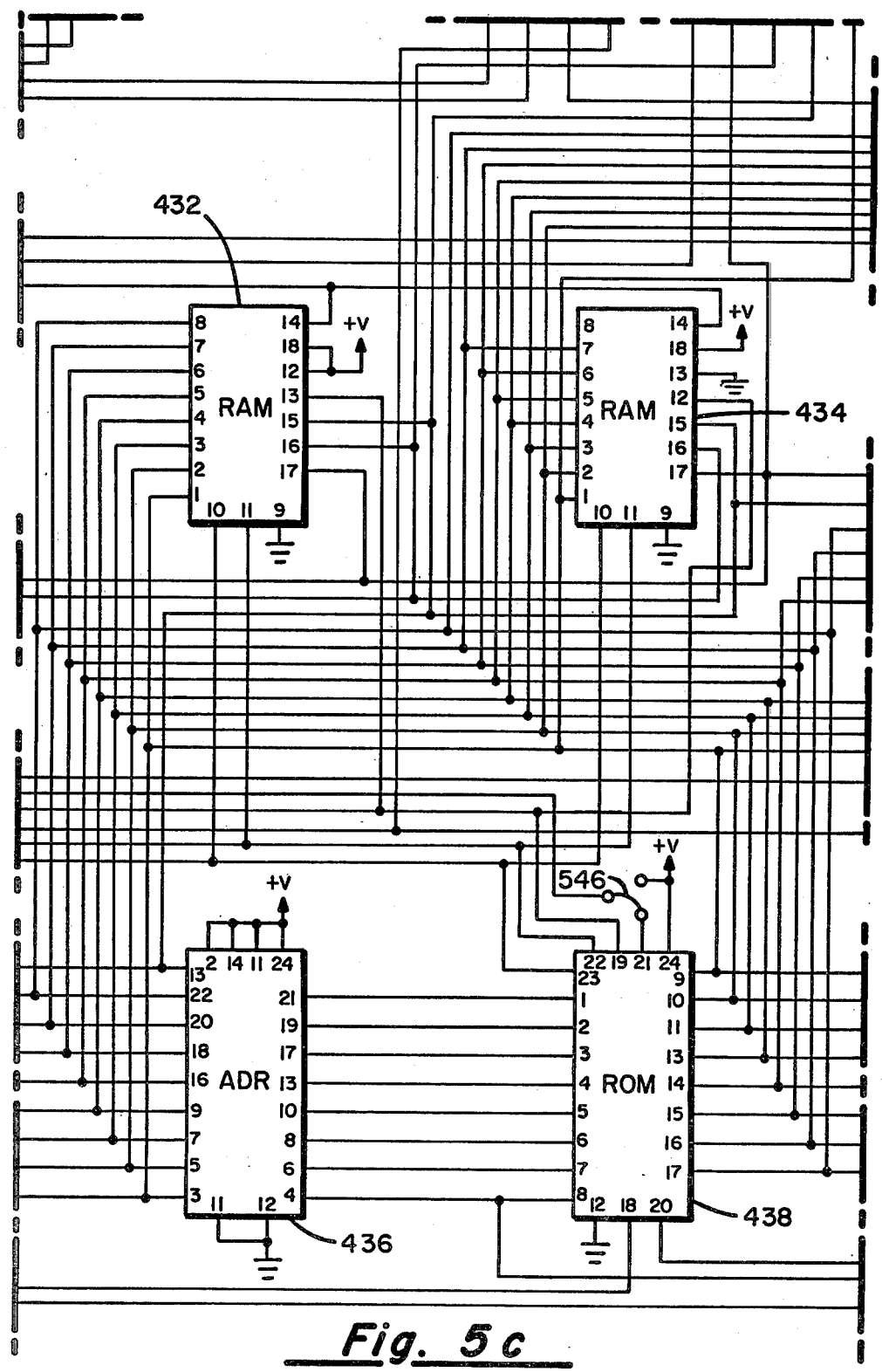
Figure 5D:
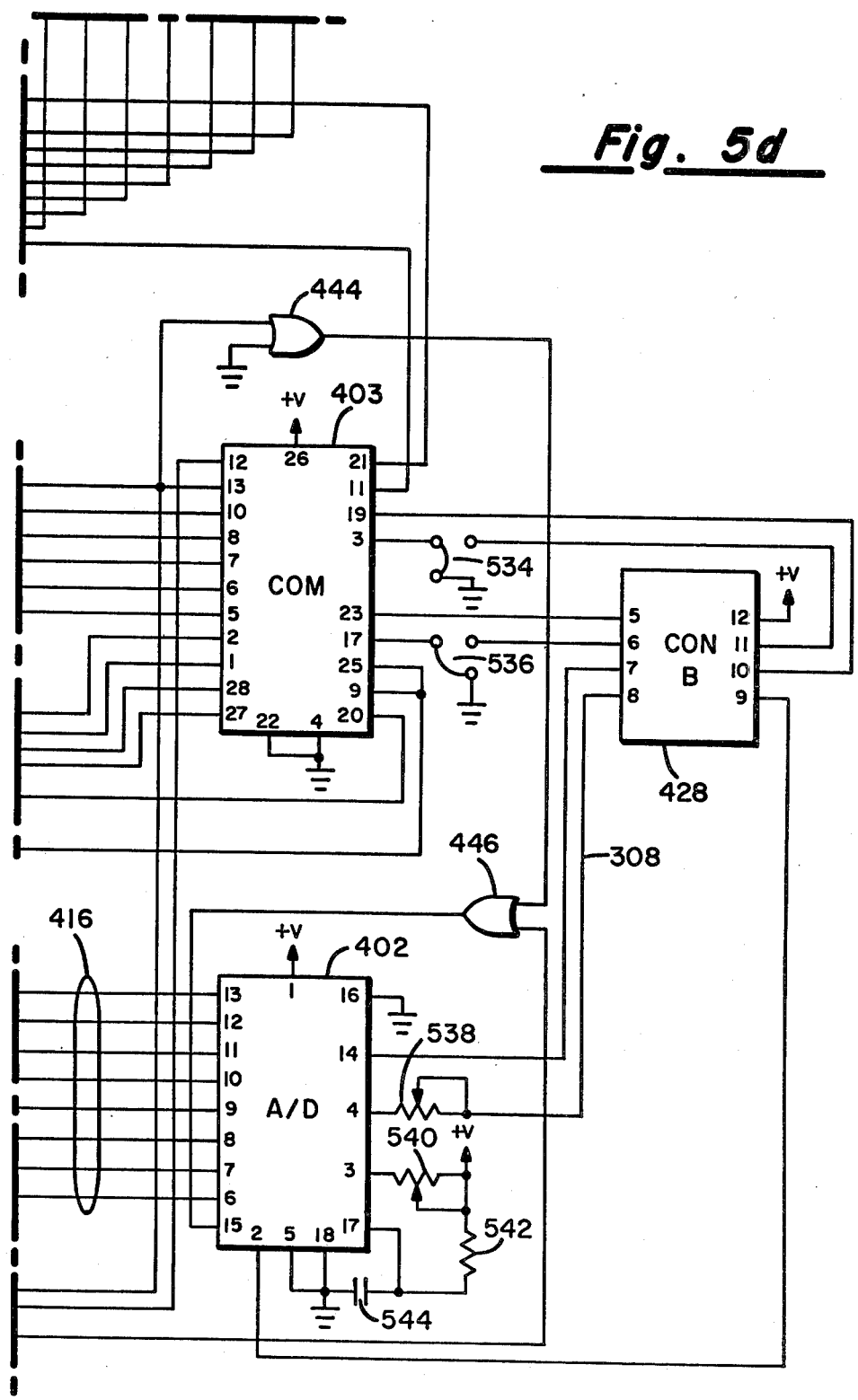

FIG. 5 is a detailed schematic diagram of digital 400. It is laid out in a slightly different manner than that shown in block diagram of FIG. 3, which was laid out in a manner for easy conceptualization. The analog to digital converter employed is A/D402. It is a product of Analog Devices and is their Model AD7574. It was chosen as a CMOS eight-bit A/D converter, having a minimum conversion time of 15 microseconds. A/D402 receives its analog input from pin 4 and compares it against the reference received on pin 3. The amplitude of the analog input is adjustable using 2k ohm variable resistor 538 which is a factory or maintenance adjustment and is not intended to be adjusted by the patient. Similarly, the reference voltage is established using variable resistor 540, which is also 2k ohms. The internal clock oscillator for A/D 402 is controlled by resistor 542, which is 120k ohms and capacitor 544 which has a value of 100 picofarads. The data output of A/D402 is via cable 416, as shown. As can be seen from the drawing this is the standard eight-bit data bus used within digital 400. The BEGIN CONVERSION and READ signal is on pin 15. This signal is driven by OR gate 446. This enables the converter to be initiated and read, by simultaneous logic low levels either via output at pin 11 of decode 422 and the output of OR gate 444. As can be seen, the output of OR gate 444 is simply the read line that is common to the memory devices of digital 400. As will be seen in the firmware for transmitter 30, the normal way of initiating A/D 402 and reading the data output is to treat it as if it were a special location within the available memory. In this way, since pin 15 of A/D 402 requires a negative input to begin reading, OR gate 446 actually acts as if it were an AND function and thereby requires a specific address from decode 422 and also a READ signal to be present on the internal memory address bus.

Connections between analog 200 and digital 400 may be made in a variety of ways. In the preferred embodiment the circuitry of analog 200 is on one printed circuit board and the circuitry of digital 400 is on another. The connection between the two boards may be facilitated with the use of inter printed circuit board connectors. As shown in FIG. 5, these are represented as CONA 426 and CONB 428. The various signals that go to these connectors are labeled as required and will be discussed so that the reader can relate to the corresponding circuitry of analog 200 as shown in FIG. 4.

Microprocessor 424 is an INTEL Model 8085. Crystal 464 is connected to pins 1 and 2 as shown in the diagram and is described in the manufacturer's literature corresponding to microprocessor 424. Pin 3 of microprocessor 424 is a reset output. This applies an output signal corresponding to a reset condition that allows resetting of other associated circuitry requiring some sort of CLEAR or INITIATE signal. Pin 4 of microprocessor 424 is the serial output data pin. The serial output data is programmable data bit that is used as the output data to drive output generation 206. As can be seen from FIG. 5 and also reference to FIG. 4, pin 4 is connected via CONA 426 to operational amplifier 312 via line 300. As stated above, this then becomes the squelch control signal which controls when modulated signals are placed upon the telephonic communication network. Referring again to FIG. 5, pin 5 of microprocessor 424 is the serial input data input. This is a program readable input bit and in the present embodiment is used to communicate the TRANSMIT signal from a patient operated pushbutton. Referring to FIG. 3 one can see that this button is labeled Transmit 412 and connects plug voltage to line 408. Referring back to FIG. 5, the line 408 is connected to pin 5 of microprocessor 424. Grounding resistor 468 has a value of 9.1k ohms. The preferred mode does not use the trap interrupt present on pin 6 of microprocessor 424, nor the interrupt line on pin 10. Therefore, these two lines are grounded.

The 7.5 maskable interrupt is connected to the 5.5 maskable interrupt. They are present at pins 7 and 9 respectively. These interrupts are generated as result of a timer countdown of RAM/TIMER 430. As can be seen, the line is connected to pin 6 of RAM/TIMER 430. The discussion below describes the method of generation and use of this interrupt.

Pin 8 of microprocessor 424 is the level 6.5 maskable interrupt. It has a pullup resistor 466 connected in parallel. Connection between pin 8 and operational amplifier 292 of peak detection 204 (also FIG. 4), is made via CONA 426, pin 3 and line 304.

Pins 12 through 19 of microprocessor 424 are addressing lines 0 through 7. Notice that they are connected to the memory devices within digital 400 via an address bus. The upper eight addressing bits (i.e., addressing bits 8 through 15) are present at pins 21 through 28 of microprocessor 424. These addressing bits are used primarily as select lines to the select amongst memory and other devices. Pins 21 and 22 (i.e., addressing bits 8 and 9) select RAM 432 and 434. Addressing bits 11 through 13 (i.e., pins 24–26), are sent to decode 422 for translation as discussed below. The remaining addressing bits are used as shown. The ADDRESS/ENABLE signal is present on pin 30 and is distributed along the memory bus as shown. The WRITE and READ signals are present on pins 31 and 32 as shown. Notice that these are distributed along the addressing bus by using gates 442 and 440 respectively. Notice that pullup resistors 470 and 472 are also used.

The reset input to microprocessor 424 is connected to the reset button 410. Again, as shown in the previous drawings, this is a patient-actuated input and pressing the button forces microprocessor 424 to reinitiate its programs at address 00 as explained in the INTEL literature. Pin 37 is the output of the CLOCK signal of microprocessor 424. Notice that it is distributed to RAM/TIMER 430 and COM 403 as shown. This permits these devices to operate synchronously with microprocessor 424.

Decode 422 is a three-bit to eight output decoder. It is used to decode address bits 11, 12 and 13 to produce ENABLE signals for the various devices, using the address bus. The inputs to the code 422 are strappable using input straps 452, 454, and 456. This enables the maintenance or the manufacturing agency to readily change the addressing scheme. These are not to be used by the patient. The enables of Decode 422 (i.e., pins 4 and 5), are driven by addressing bits 14 and 15 (i.e., pins 27 and 28) of the microprocessor 424. Notice that these inputs are also strappable using straps 448 and 450. Decode 422 is preferably an INTEL Model 8205 decoder.

The outputs of decode 422 are used as enables to the various devices as explained below. For example, output 0 is present at pin 15. It is used to enable ROM 438. Similarly, output 1 which is present at pin 14 is used to enable RAM 432 and RAM 434. Output 3 is present at pin 12 and is used to enable COM 403. As explained above, A/D 402 is enabled by output 4 present at pin 11.

RAM/TIMER 430 is an INTEL Model 8155 device. It performs three basic functions. It contains 256 bytes of RAM storage. It has three I/O ports. It also contains a countdown timer. Pin positions 21 through 28 are known as I/O port A. It is an eight-bit port which may be programmable for input or output. As is seen in the description of the firmware, port A is used as an input port and provides for the input of patient ID information. Switch 418 is the eight-bit, manually operated patient ID input switch. Notice that it contains separate switches 502, 504, 506, 508, 510, 512, 514 and 516. Through these switches the physician presets the patient's unique patient ID number. If all switches are open except switch 516, the test mode is entered causing test data to be generated and transmitted. Notice that pullup resistors 490, 492, 494, 496, 498, 500 and 501 are used.

Pins 29 through 36 of RAM/TIMER 430 are I/O port B. As with I/O port A, I/O port B is programmed through the firmware of the preferred embodiment for input. Switch assembly 420 contains eight individual switches designated 518, 520, 522, 524, 526, 528, 530 and 532. Through these eight individual switches, the physician presets the patient's valve ID number. Notice that, as in the case with port A, pullup resistors are used. These are resistors 474, 476, 478, 480, 482, 484, 486, and 488.

I/O port C is a six-bit port, using pins 37 for bit 0, 38 for bit 1, 39 for bit 2, 1 for bit 3, 2 for bit 4, and, 5 for bit 5. Pins 37, 38 and 39 being bits 0, 1 and 2 of I/O port C are used to control the gain of gain 244 via cable 306 (see also FIG. 4). Pin 37, bit 0, is connected via pin 14 of CONA 426 to gain 244, pin 6 via line 306A. Similarly, pin 38 of RAM/TIMER 430 is connected by pin 2 of CONA 426 to line 306B and hence to pin 5 of gain 244. Similarly, pin 39 of RAM/TIMER 430 is connected via pin 15 of CONA 426 to pin 7 of gain 244 via line 306C.

Bit 3 of port C is connected from pin 1 of RAM/TIMER 430 to pin 13 of CONA 426. Similarly, bit 4 of port C is connected from pin 2 of RAM/TIMER 430 to pin 4 of CONA 426. Bit 5 of port C is connected to reset of COM403 which is at pin 21. It will be seen when examining the firmware that this can be used to reset that device.

Pin 6 of RAM/TIMER 430 is the output of the timer. As can be seen from the manufacturer's literature RAM/TIMER 430 has a decrementable register which is entered using the proper commands and upon decrementing will produce an output signal at pin 6. As can be seen in the drawing, this is connected to the 7.5 level and 5.5 level interrupts of microprocessor 424. In the firmware discussions it is seen that this enables the microprocessor to be interrupted at various precise times. Pins 8, 9, 10 and 11 are the enable, read, write and address latch enable inputs, respectively. As can be seen there are simply connected to the address bus as with any other memory element. Pins 12 through 19 are the eight address bit positions which are also connected to the address bus.

RAM 432 and RAM 434 are each 1k by 8 bit storage devices. They are connected to the address and data buses in a similar fashion. They are addressed in the same way. The only difference in connection between RAM 432 and RAM 434 is that address bit 10 as connected to microprocessor 424, pin 23, is connected with opposite polarities such that either one or the other is enabled. It can be seen that the address bit 10 is connected to the $\overline{CE}$ input pin 13 of RAM 432 is connected to the CE2 input pin 12 of RAM 434.

The addressing space defined in the preferred embodiment may be seen in Table A. Notice that all address are given in hexadecimal. The address space from address 0800 to 0BFF is found in RAM 432 and the address space 0C00 to 0FFF is found in RAM 434. Notice also that the entire address space above address 1000 is allocated to RAM/TIMER 430. The address space from address 0000 to 07FF is found in ROM 438. Referring again to FIG. 5, it can be seen that ROM 438 is addressed by address register ADR436. This device is an INTEL Model 8212 Address Register. Notice that ADR436 is connected to the address bus as with the random access memories and has an address output which is simply connected to the eight address input lines of ROM 438. The eight data output pins of ROM 438 are pins 9 through 17 and, as can be seen, they are simply connected to the data/address bus. Additional addressing pins are available as pins 23, 22, 19 and 21 providing address bits 8, 9, 10 and 11 respectively. Address bits 8, 9 and 10 (i.e., pins 23, 22 and 19) are simply connected to the address bus. Pin 21, being address bit 11, is strappable to the address bus as well, using strap 546 as shown. This provides additional ROM expansion space, if necessary. Of course, ROM 438 is only enabled during the proper addressing time by decode 422, output 0 as explained above. This enable is found on pin 18. Pin 20 is an output enable and it is connected to the read line of the addressing bus, which is driven by gate 440. Notice that this signal is required in order to enable data from ROM 438 to the shared data and addressing bus.

The major remaining logic element shown in FIG. 5 is COM403. It is preferably an INTEL Model 8251 Communications Chip. Commonly called USART it serializes the click data stored in memory into RS-232 format for transmission to the telephonic communication path 40 via output generation 206. The output of COM403 is found on pin 19. Notice it is coupled to pin 10 of CONB 428 and thence to operational amplifier 346 via line 302 (see also FIG. 4). Referring again to FIG. 5, it can be seen that the CTS output of COM403 is pin 17 and is strapped to ground by strap 536. Notice that provision is made for transmission of that signal to the MODEM should synchronous communication be desired.

TABLE A

| ADDRESS (HEX) | DEVICE |
| --- | --- |
| 0000 - 07FF | ROM 438 |
| 0800 - 0BFF | RAM 432 |
| 0C00 - 0FFF | RAM 434 |
| 1000 - 17FF | RAM/TIMER 430 |

TABLE B

| ADDRESS | USE |
| --- | --- |
| 1000 - 13FF | RAM of RAM/TIMER 430 (Repeat each $256_{10}$) |
| 1400 | COMMAND/STATUS of RAM/TIMER 430 |
| 1401 | PORT A of RAM/TIMER 430 |
| 1402 | PORT B of RAM/TIMER 430 |
| 1403 | PORT C of RAM/TIMER 430 |
| 1404 | LSB of Timer Count |
| 1405 | MSB of Timer Count |
| 1800 | DATA REG OF COM 403 |
| 2000 | AD 402 |

Similarly, pin 3 is receiver data which is strapped to ground by strap 534, since it is not in use at this time. The chip select input is pin 11 which is connected to output 1 of decode 422. This enables the loading of status registers within COM403 by microprocessor 424 by using specialized addresses. Table B shows the special addresses in use.

Referring again to FIG. 5, it can be seen that pins 27, 28, 1, 2, 5, 6, 7, and 8 are the data bits (i.e., bits 0–7) of COM 403). Notice that these pins are simply connected to the eight-bit address/data bus. Similarly, pins 10 and 13, being the write and read inputs, must also be connected to the data bus to allow reading and writing from the data register and command register. Notice that pin 12 determines whether an access will be to the command or data register and that it is simply connected to address 0 from ADR436 at pin 4.

In the manner shown in FIG. 5 and as also seen in tables A and B, microprocessor 424 is able to address and communicate with the various devices within digital 400. Particular attention should be paid to Table B which shows those specialized addresses which are of significance to the firmware of transmitter 30. These addresses will help the reader in reviewing the program listings attached as an appendix hereto.

FIRMWARE FOR TRANSMITTER 30

Figure 6A:
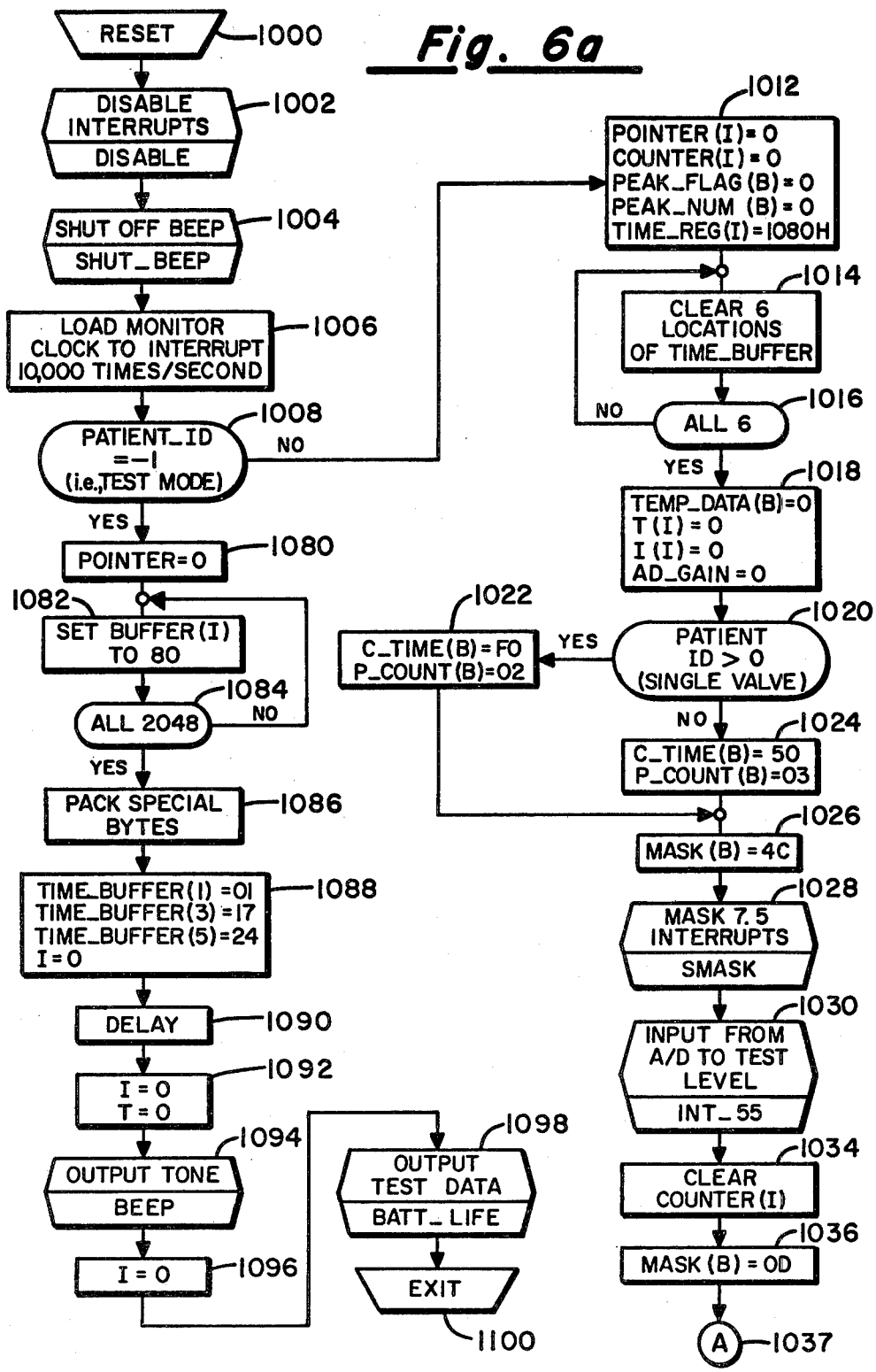
FIG. 6 is a flowchart of the firmware for the main transmitter program.
Figure 6B:
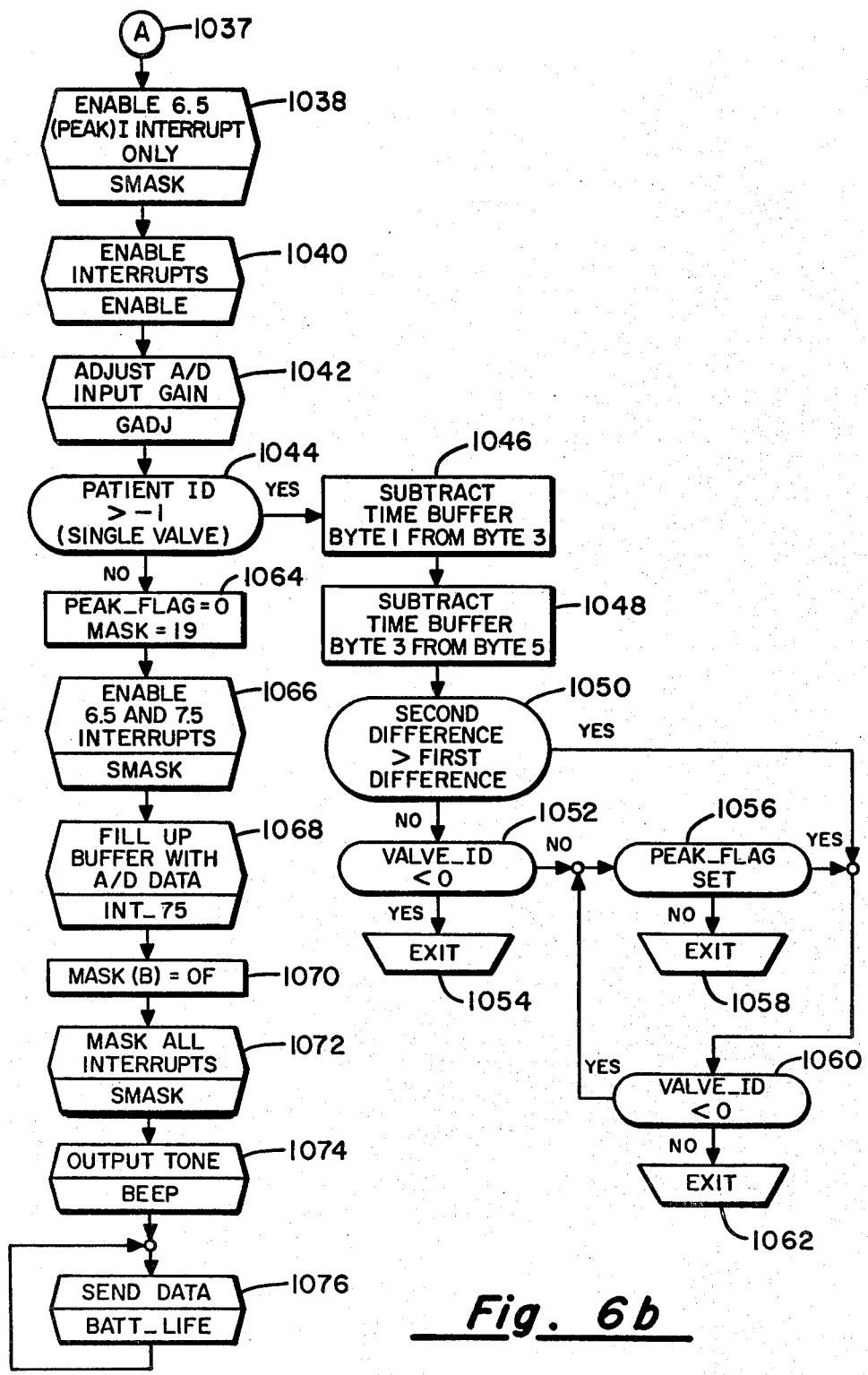

FIG. 6 is detailed flowchart of the specialized firmware used for transmitter 30. The firmware is entered at element reset 1000 as a result of a depressing of the reset 410 by the patient (see also FIG. 3) or at Power up. Pressing the button vectors the microprocessor 424 to address 0 which causes execution of the main program. Control is transferred to subroutine DISABLE at element 1002 for the purpose of disabling all interrupts. Control is then transferred to element SHUT$_{14}$BEEP to shut off the carrier tone of the MODEM at element 1004. Element 1006 causes the monitor clock of RAM/TIMER 430 to be loaded with an interger causing a 7.5 level or 5.5 level maskable interrupt 10,000 times per second. By consulting Table B, one can see that this is loaded by referencing addresses 1400, 1404, and 1405 hexadecimal.

Referring again to FIG. 6, it can be seen that at element 1008, the decision is made whether or not the patient ID is equal to −1 exactly. As explained before, the physician presets the patient's unique ID number on eight-bit switch 418 (see also FIG. 3). The maintenance personnel are instructed that entry of −1 or FF hexadecimal (i.e., all switches open as shown in FIG. 5), causes entry into the test program. As can be seen in FIG. 5, the patient ID is read through I/O port A of RAM/TIMER 430. Referring to Table B, it can be seen that this is referenced using address 1401 hexadecimal.

Referring again to FIG. 6, it can be seen that if test mode is selected, the branch is made and the program proceeds to test at element 1010. Assuming that the patient has entered a valid patient ID and not selected test mode, the program branches to element 1012 which initializes a number of program variables. Element 1014, in combination with element 1016 causes clearing of all six bytes of variable array TIME$_{14}$BUFFER. It is within this array that the time tags are stored for computation of the intervals between clicks. Some additional variable are initialized at element 1018. Notice that variable AD$_{14}$GAIN is set to 0, minimizing the gain of element GAIN244 (see also FIG. 4).

Referring again to FIG. 6, it can be seen that element 1020 determines whether or not a given patient has a single or multiple valve implant. Notice that the physician is instructed to enter a positive patient ID if a given patient has a single valve implant and a negative patient ID if he has a multiple valve implant. Element 1022 initializes the time and count for the single valve patient. Similarly, element 1024 initializes those same values for multiple valve patients.

A mask is prepared at element 1026 for entry by procedure SMASK at element 1028 to mask level 7.5 interrupts but not level 5.5 or 6.5. Control is then transferred at element 1030 to procedure INT_55 for the purpose of inputting from A/D402. Notice that this input is primarily to establish the level to be used for GAIN244.

A new mask is established at element 1036 and control return to procedure SMASK at element 1038 to mask all interrupts except 6.5 level. As can be recalled, the 6.5 level interrupt is the peak interrupt generated by peak detection 204 (see also FIG. 4).

Element 1040 transfers control to procedure ENABLE to enable interrupts in the expectation that a 6.5 level interrupt will be generated. Control is then transferred to procedure GADJ at element 1042 for the purpose of adjusting the input gain to AD402. As is explained in the discussions above, this adjustment is caused by supplying a three bit value via I/O port C of RAM/TIMER 430 to GAIN 244. Element 1044 again makes the determination of whether the present patient is a single valve or multiple valve patient. This is important because multiple valve patients will have more than one click to be monitored per cardiac cycle and because the data must be gathered concerning the time interval between each click within the same heart cycle.

For a single valve patient, element 1064 sets the interrupt mask to 19 hexadecimal and element 1066 returns control to procedure SMASK. This enables both 6.5 level and 7.5 level interrupts. Control is then relinquished to procedure INT_75 at element 1068 to fill up the buffer with data from A/D402. Element 1070 prepares a new mask of 0F hexadecimal following input of all data. Control is transferred to procedure SMASK at element 1072 to mask all maskable interrupts. Control is transferred to procedure BEEP at element 1074 to initiate a carrier for transmission of the data. Element 1076 transfers control to procedure BATT_LIFE which actually transfers the data to the centralized monitoring site. Element 1078 re-enters procedure BATT14 LIFE to allow repeat transmissions of data.

Assuming that element 1044 determines that the patient is a multiple valve patient, element 1046 subtracts the time buffer byte one from the time buffer byte three. This corresponds to the determination of whether the interval between clicks of the same heart cycle is greater than the interval between clicks of different heart cycles. This computation is continued at element 1048. Element 1050 then determines whether the interval is greater if the detemination is YES, the element 1060 determines whether the valve ID is greater than 0. If the answer is NO, the patient cannot be tested and exit is made an element 1060. If the valve ID is a positive number, element 1060 sends control to element 1056 which determines whether or not the Peak flag is set. If the Peak flag is not set that indicates that the valves could not be heard and exit is again made at element 1058. If element 1050 determines that the second difference is not greater than the first difference, then the valve ID again is checked and if it is greater than 0, then the patient is again not testable and exit is made at element 1054.

If element 1008 determines that test mode has been selected, the program is sent to element 1010 to perform the testing. Basically, the test function allows the packing of standard data into the system for transmission to the centralized monitoring site to check the operation of the hardware along the system. Element 1080, 1082 and 1084 combine to pack all 2,048 bytes of the data buffer with the selected background values for the test. Element 1086 then packs certain special bytes with the test information. Element 1088 then packs the selected time interval values into the time buffer and element 1090 generates a program delay corresponding to the normal processing time.

Elements 1092 and following then combine to output the test data to check the remainder of the system. Element 1094, for example, transfer control to procedure BEEP for imitation of the patient click detected signal. Element 1096 and 1098 correspond to return control to procedure BATT_LIFE to output the test data and exit is made from the main program at element 1100 corresponding to completion of the test.

Figure 7:
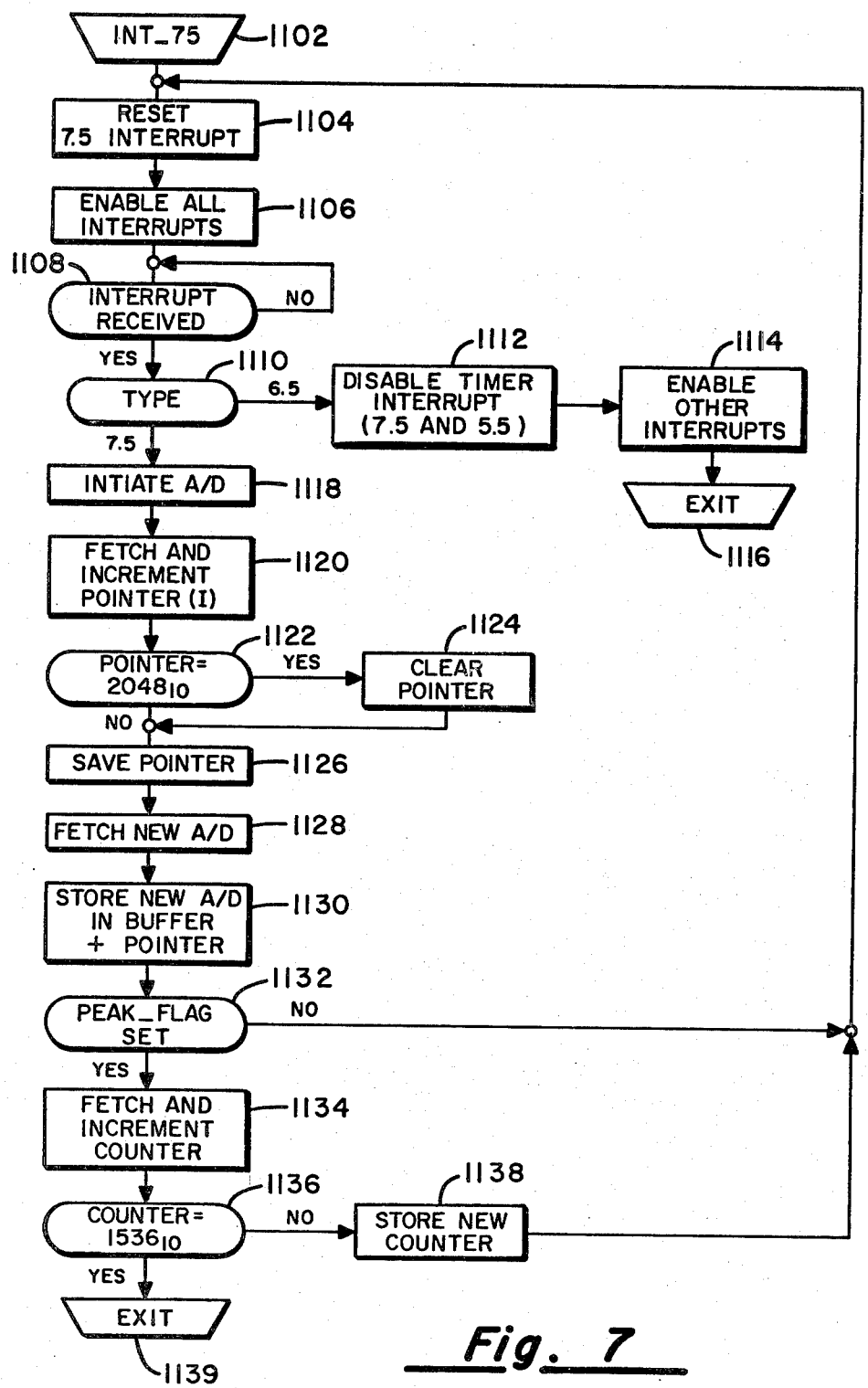
FIG. 7 is a flowchart of subroutine INT_75.

FIG. 7 is a detailed flowchart of the firmware corresponding to procedure INT_75. As is seen in FIG. 6, this procedure is used to fill up the input buffer with the A/D data. There are 2,048 decimal bytes of information required for the normal monitoring cycle. Entry is made to procedure INT_75 at element 1102. Element 1104 resets the 7.5 level interrupt which is required by the INTEL Model 85 microprocessor. Element 1106 enables all interrupts and element 1108 continues to delay awaiting an interrupt. As is explained above, the level 7.5 interrupt corresponds to a timing signal generated by RAM/TIMER 430. This interrupt is generated 10,000 times per second as was programmed at element 1006 of the main program (see also FIG. 6). Referring again to FIG. 7 control is transferred to element 1110 upon receipt of the interrupt. Actually what does occur is that the receipt of the interrupt causes the program counter to be vectored to the place corresponding to the interrupt recived.

Element 1110 determines which type of interrupt was received as stated above, the level 7.5 interrupt corresponds to a timer indication. The level 6.5 interrupt corresponds to a peak detected by peak detection 204 (see also FIG. 4). Receipt of the 6.5 level interrupt signifies the receipt of a click and element 1112 disables the timer interrupt. Other interrupts are enabled at element 1114 and element 1116 exits to the main program. Assuming that the interrupt was level 7.5 interrupt (i.e., timer interrupt), element 1118 initiates the A/D conversion. As was discussed above in connection with Table B, initiation of A/D 402 corresponds to a reading at memory address 2000 hexadecimal. Becuase of time delays within the converter the first command to A/D 402 initates the converter and the next command will cause a reading of that data. Therefore, the command at element 1118 will in general result in the reading of information which is not valid and is to be discarded.

Element 1120 sets up the loop for reading the data from A/D 402 some 2,048 decimal times. Element 1122 determines whether the pointer has been incremented that many times. If it has, element 1124 clears the pointer. The pointer is saved as element 1126 and element 1128 fetches the new data from A/D 402. As has been explained that corresponds to reading address 2000 hexadecimal.

Element 1130 stores the newly fetched byte of information from A/D 402 in the 2,048 byte buffer at a place specified by the pointer and the peak flag is checked at element 1132. If the peak flag is set, then as has been received, the procedure is continued at element 1134. If the peak flag is not set, control is merely sent back to element 1104 for another pass.

If the peak flag is set, element 1134 increments the counter and a determination is made at element 1136 whether or not the counter has yet reached 1,536 decimal. If it has not, the new value of the counter is stored at element 1138 and control is returned to element 1104. After the counter has reached the maximum value, the subroutine is exited at element 1139. The exit, of course, returns control to the calling main program.

Figure 8:
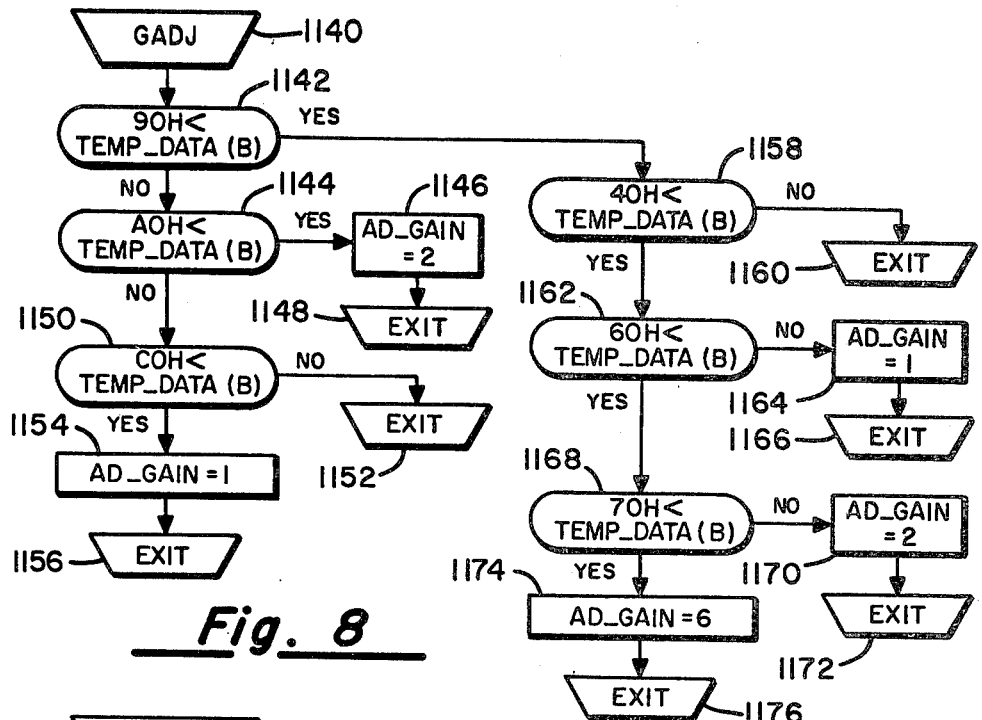
FIG. 8 is a flowchart for subroutine GADJ.

FIG. 8 shows the flowchart for procedure GADJ. As is recalled in the discussion of the main program, this procedure is called at element 1042 (see also FIG. 6), for the purpose of adjusting the gain of the analog signal to the input by a A/D 402. This adjustment is, of course, made by transferring a three bit value from port C of RAM/TIMER 430 to element GAIN 244.

Returning again to FIG. 8, it can be seen that element 1142 determines whether the value of TEMP_DATA is greater than 90 hexadecimal. The variable TEMP_DATA is a single byte corresponding to the largest value read from A/D 402. If the value is sufficiently large, control is transferred to element 1158. If not, element 1144 determines whether A0 hexadecimal is less than that variable. If YES, then the gain is changed by element 1146 by setting variable AD_GAIN equal to two and exiting by element 1148. Variable AD_GAIN is actually address 1403 as can be seen in Table B. This corresponds to the value to be loaded into port C for transmission to GAIN 244.

Element 1158 determines whether or not 40 hexadecimal is less than the last input value. If NO, exit is made at element 1160. If YES, element 1162 determines whether 60 hexadecimal is less than TEMP_DATA. If NO, element 1164 sets AD_GAIN equal to 1, and exits at element 1166. If YES, then element 1168 determines whether 70 hexadecimal is less than TEMP_DATA. If NO, element 1170 sets AD_GAIN equal to, and exits at element 1172. If YES, then element 1174 sets AD_GAIN equal to 6, and exits at element 1176. Notice that procedure GADJ in this manner, sets an optimal level for amplitude of the input to AD402.

Figure 9:
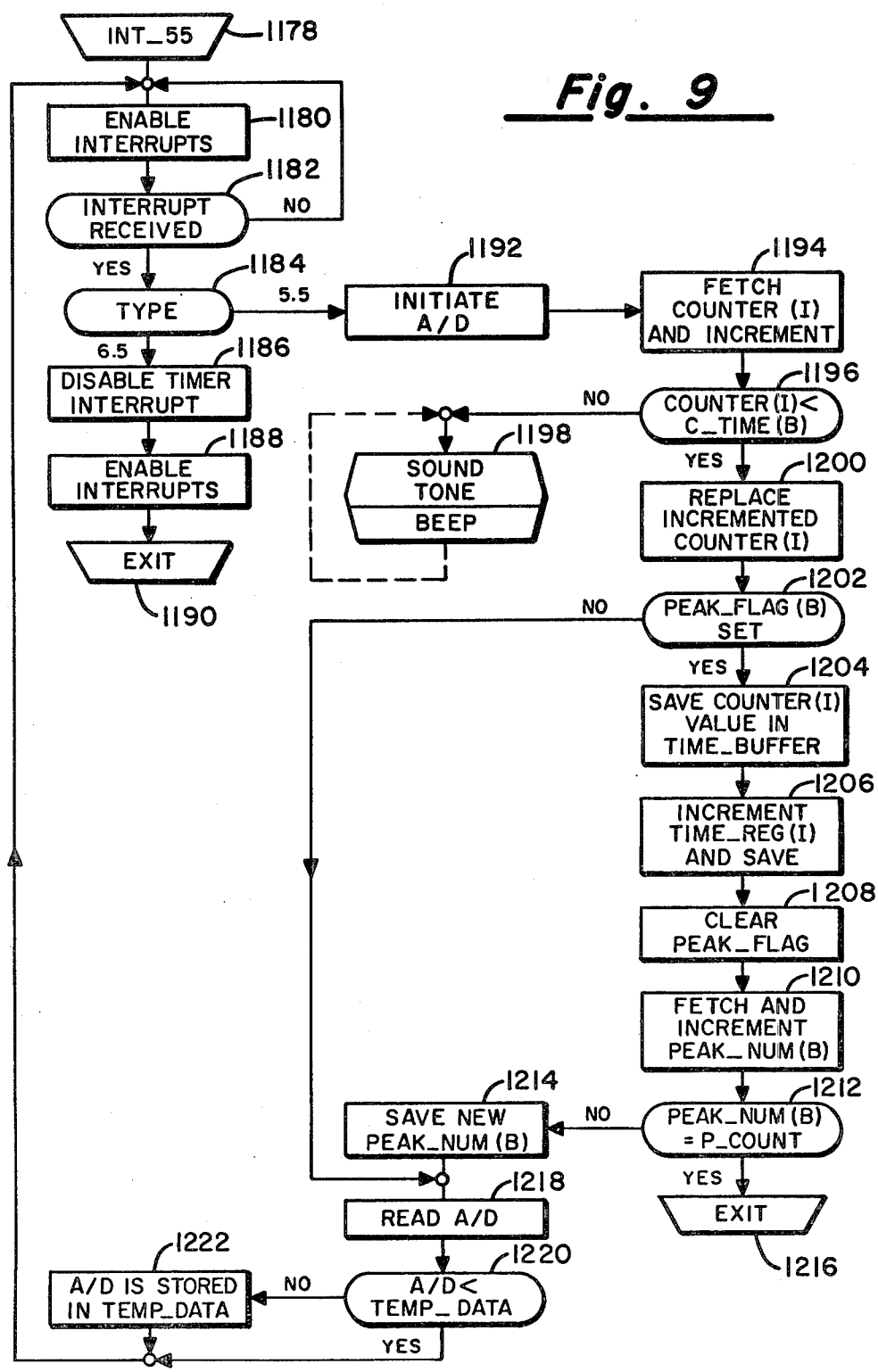
FIG. 9 is a flowchart of subroutine INT_55.

FIG. 9 is a flowchart for procedure INT_55. As is shown at element 1030 of FIG. 6, the main program calls this procedure to input from A/D402. Referring again to FIG. 9, it can be seen that element 1180 enables interrupts. Element 1182 insures that control is not advanced until an interrupt is received. Upon receipt of an interrupt, element 1184 determines the interrupt type. In this case, because of the mask generated at element 1026 and entered at element 1028 (see also FIG. 6), the only interrupts expected are level 5.5 interrupts or level 6.5 interrupts. The level 6.5 interrupts are as explained above, the results of the timer from RAM/TIMER 430. Upon receipt of such an interrupt, element 1186 disables the timer interrupt. Element 1188 enables other interrupts and element 1190 exits to the main program.

Assuming the interrupt received was a level 5.5 interrupt, control goes to element 1192 which initiates A/D402. As explained above, the operation of element 1184 is actually the hardware vectoring process corresponding to the possible interrupt types. Again, as also explained above, the data received at element 1192 is discarded since it corresponds to the previous conversion.

Element 1194 and element 1196 inititate the counter loop. Should the value of the counter be less than the value of C_TIME control is transferred to procedure BEEP by element 1198. This, of course, turns on the carrier. The return of element 1198 is in a tight loop which, of course, is broken by the interrupt received. Element 1196 transfers control to element 1200 upon a determination that counter is no longer less than variable C_TIME. The value of C_TIME is F0 hexadecimal for single valve patients and 50 hexadecimal for multiple valve patients as set by elements 1022 and 1024 respectively (see also FIG. 6).

Element 1200 replaces the value of the counter in memory and element 1202 determines whether the peak flag is set. If not, control proceeds to element 1218. If the peak flag is set, element 1204 saves the counter value in TIME_BUFFER. Notice that this time tags the point at which the peak is received. Element 1206 increments variable TIME_REG and saves it. This element keeps a running track of time during the input process. Element 1208 clears the peak flag and element 1210 increments the peak number. Element 1212 determines whether or not the peak number has reached the value of variable P_COUNT which was established at element 1022 for single valve patients (i.e., 2) or at element 1024 for multiple valve patients (i.e., 3). If YES, the routine exits at element 1216. If NO, element 1214 saves the new value of PEAK-NUM and A/D 402 is again read at element 1218.

Element 1220 determines whether the last read value from A/D 402 is less than TEMP_DATA. If NO, the new A/D value is stored at TEMP_DATA. In either case, however, control is rturned to element 1180 for additional processing. This continues until a level 6.5 interrupt is received or the desired number of peaks (i.e., 2 or 3) have been counted.

FIG. 10 is a flowchart for subroutine DISABLE. Notice that it merely disables all interrupts at element 1226. Exit is via element 1228.

FIG. 11 is a flowchart of subroutine SMASK. After entry at element 1230, element 1232 fetches the desired interrupt mask. Element 1234 sets the mask into the status register. Exit is via element 1236.

The flowchart for subroutine BEEP is found in FIG. 12. Entry is via element 1238. An interrupt mask value of C0 hexadecimal is chosen at element 1240. Element 1242 calls procedure SMASK to start the carrier of output generation 206. This occurs by setting the serial output data (SOD) bit. As explained above, this ignal is coupled via line 300 to operational amplifier 312 (see also FIG. 4). Element 1244 causes a delay by repeating the sequence 2001 times.

Element 1246 selects a mask of 40 hexadecimal. Procedure SMASK is again called at element 1248. This mask (i.e., 40) clears the serial output data bit causing the output of output generation 206 to be squelched. Element 1250 delays by repeating the sequence 2001 times. The subroutine then exits at element 1252.

The flowchart for procedure ENABLE 1254 is found at FIG. 13. Element 1256 enables interrupts. Notice that this is in addition to the setting of a mask into the status register. Consult the manufacturer's literature for additional detail microprocessor 424 if required. Exit is made via element 1258.

Figure 14:
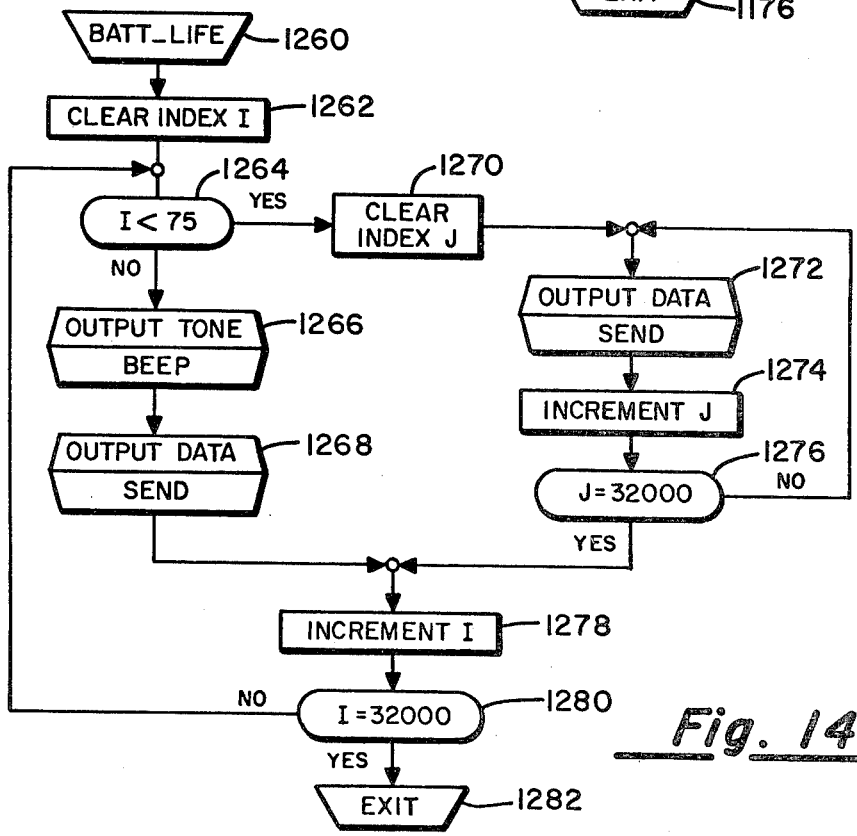
FIG. 14 is a flowchart of subroutine BATT_LIFE.

The data gathered and stored within the RAM is output by procedure BATT_LIFE having a flowchart in FIG. 14. After entry at element 1260, element 1262 clears main index I. Element 1264 insures that, on the first 75 iterations, procedure BEEP is not called. For these first iterations, element 1270 clears Index J, procedure SEND is called by element 1272 to output data. Element 1274 increments J, and element 1276 determines when the smaller loop has been executed 32,000 times. Element 1278 increments Index I and element 1280 determines when the larger loop has been executed 32,000 times. After 32,000 executions of the larger loop, element 1282 exits to the calling procedure.

For the iterations after the first 75, element 1264 insures that element 1266 calls procedure BEEP to output the tone. Control is then transferred via element 1268 to procedure SEND to output data. Elements 1278 and 1280 insure that the larger loop is used 32,000 iterations and exit is provided at element 1282 as explained above.

FIG. 15 is a flowchart for procedure SEND. As can be seen, the element 1368 reads the SEND button to determine that it is being depressed by the patient. Again, this is button transmit 412 as shown on FIG. 3. As stated above, this is read as serial input data and is found within the mask register. Element 1370 next calls procedure BAUDOUT which outputs data and exit is made via element 1372.

Figure 16A:
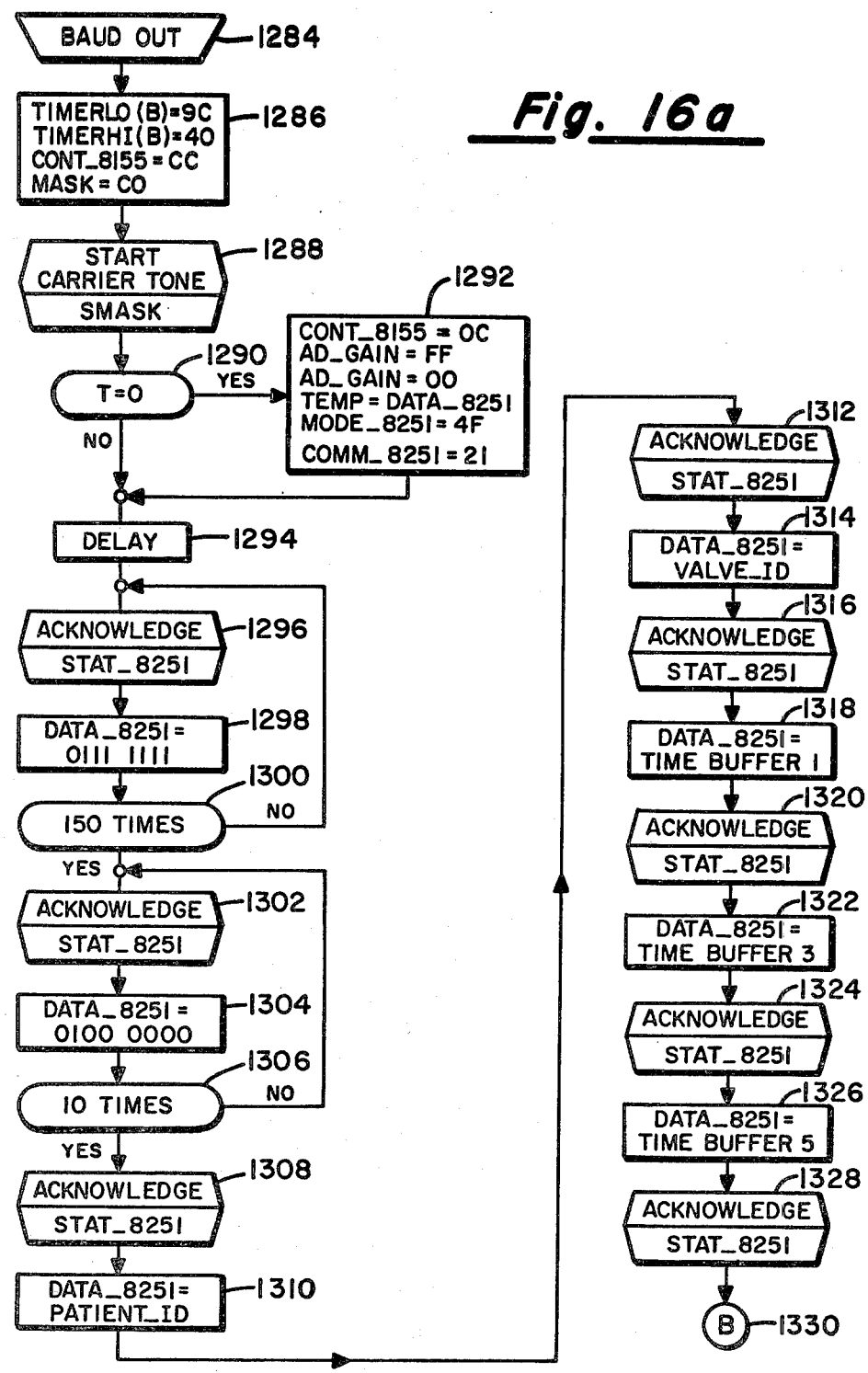
FIG. 16 is a flowchart of subroutine BAUDOUT.
Figure 16B:
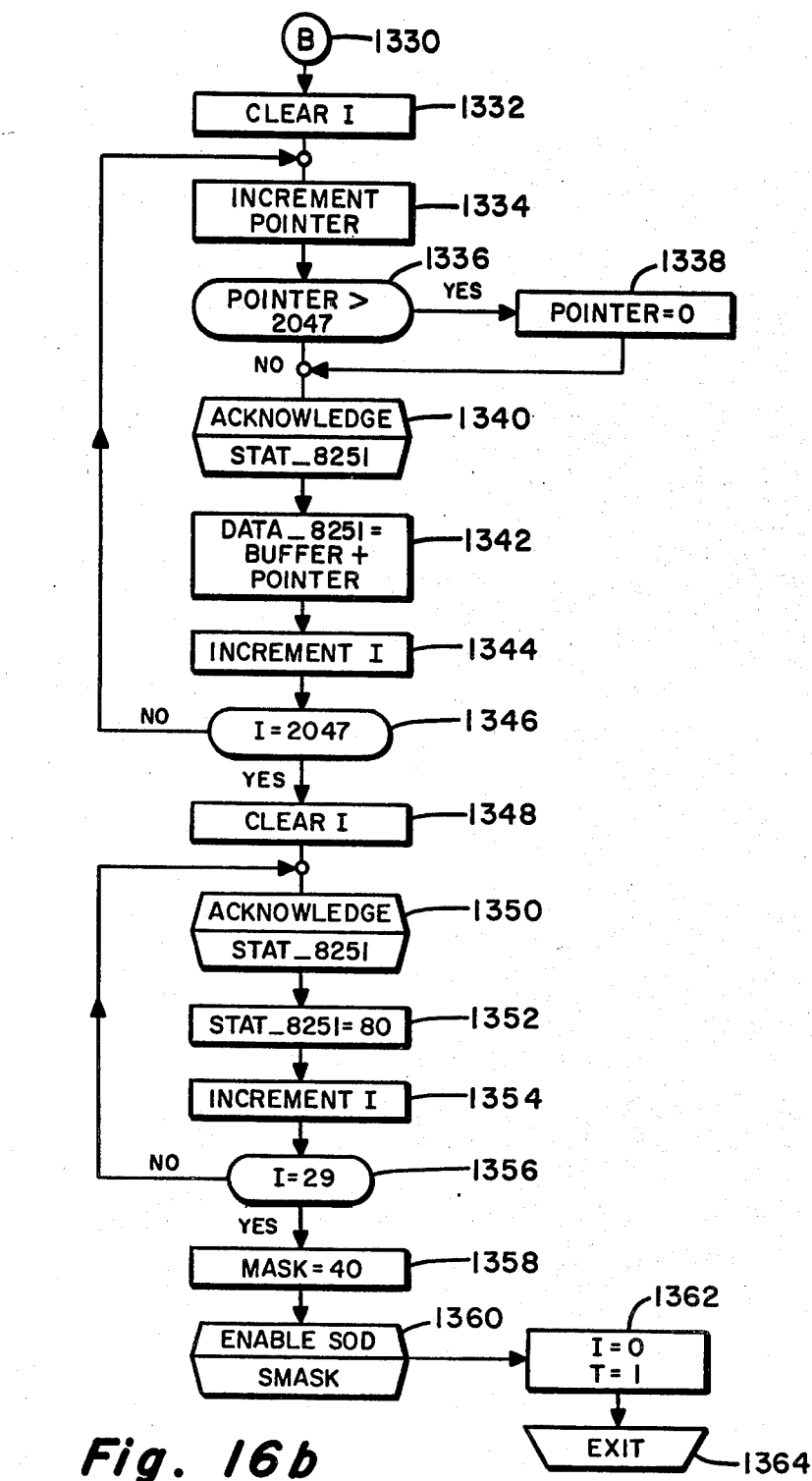

FIG. 16 features a detailed flowchart for procedure BAUDOUT. This procedure is called by procedure SEND for the purpose of formatting actual output information. Element 1286 initializes a number of values. Element 1288 calls procedure SMASK to start the carrier tone. As was stated above, this is caused by entries into the mask register which produce the serial output data signal. Element 1290 determines whether or not this is the first iteration. If YES, element 1292 initializes a number of variables. These variables are required to initialize output transmission. Variable CONT_8155 is used to control I/O port C for the purpose of controlling COM403. Notice that AD_GAIN is set to maximum and then to 0 which via bit 5 of I/O Port C does a hardware reset of COM403. Variable TEMP is set to the address beginning of the buffer to be output. MODE_8251 and COMM_8251 are set to values consistent with the transmission mode desired. In this case, it is desirable to have a clock speed of a multiple by 64. The transmission uses an eight-bit transmission with no parity. Parity is not used and there is one stop bit to be used. The output thus achieved is a standard 300 baud protocol.

Element 1295 imposes a delay and element 1296 calls procedure STAT_8251 in order to acknowledge that COM403 is ready to accept data transfer. As soon as ready, element 1298 places an initial data pattern into the variable DATA 8251 which from Table B can be seen to be address 1800 which is the data register of COM403. In essence, DATA_8251 is to be considered the output value. Element 1300 insures that a 7F hexadecimal pattern (i.e., 0111 1111) is transmitted 150 times. Element 1302 calls procedure STAT_8251 again to acknowledge the last transmission and element 1304 transmits the pattern as shown as a second portion of the preamble. Element 1306 insures that this pattern is transmitted ten times. Element 1308 again calls procedure STAT_8251 to acknowledge the readiness of COM403 for additional data. Element 1310 then transmits the patient ID variable. Element 1312 calls procedure STAT 8251 and acknowledges transmission of patient ID. Element 1314 next transfers valve ID. Element 1316 transfers control to STAT_8251 to acknowledge transmission of the valve ID.

Element 1318 next transfers the variable contained in time buffer 1. Element 1320 acknowledges the transmission. Element 1322 next transfers the contents of time buffer 3. Element 1324 again acknowledges transmission. Element 1326 transfers time buffer 5 and element 1328 again acknowledges transfer of time buffer 5. These variables are the time tags for the digital data.

Element 1332 clears the index to insure transfer of all data within the data buffer. Element 1334 increments pointer; element 1336 determines whether the pointer is incremented to 2,047. If YES, element 1338 clears the pointer again. In either case, element 1340 transfers control to STAT_8251 to acknowledge the successful completion of the last transmission. Element 1342 transfers one byte of data from the buffer incremented by the pointer and element 1344 increments the pointer. Element 1346 insures that the loop is made for 2,048 times after which element 1348 clears the index I. Element 1350 insures that the last transmission is acknowledged and element 1352 outputs a hexadecimal 80. Elements 1354 and 1356 insure that the hexadecimal character 80 is output thirty times. This is followed by element 1358 setting MASK equal to 40; element 1360 transfers control to SMASK to disable the serial output data bit and hence output generation 206. Element 1362 clears variable I and sets variable T to 1. Element 1364 exits back to the calling procedure.

FIG. 17 is a flowchart for the procedure STAT_8251. This procedure insures that the previous character has been successfully transmitted via COM403 before a new character is loaded into the output register. This is necessary because the communication protocol is transmitting, at a 300 baud serial rate, characters which are received from microprocessor 424 as eight-bit bytes. Therefore, it takes substantially less time for microprocessor 424 to transfer the data to COM403 than for COM403 to serialize and transfer the data to output generation 206.

Element 1376 fetches the variable CHECK_8251. This causes a reading of the command register of COM403. The absolute address of this variable is 1801 as can be seen from Table B. Returning again to FIG. 17, it can be seen that element 1376 reads this variable looking for a data complete signal which is AND'd at element 1378 with 1. Element 1380 determines if the result is 0, and if YES, controls the return to element 1376. This is the case when the data has not yet been transferred. Element 1380 lets control pass to element 1382 for exit to the calling routine upon seeing the data transmission complete bit set. Notice that procedure STAT_8251 is called for each byte that is transferred via COM403.

The complete program listing of the Transmitter 30 firmware is attached hereto as Appendix A.

SOFTWARE FOR COMPUTER 70

Figure 18:
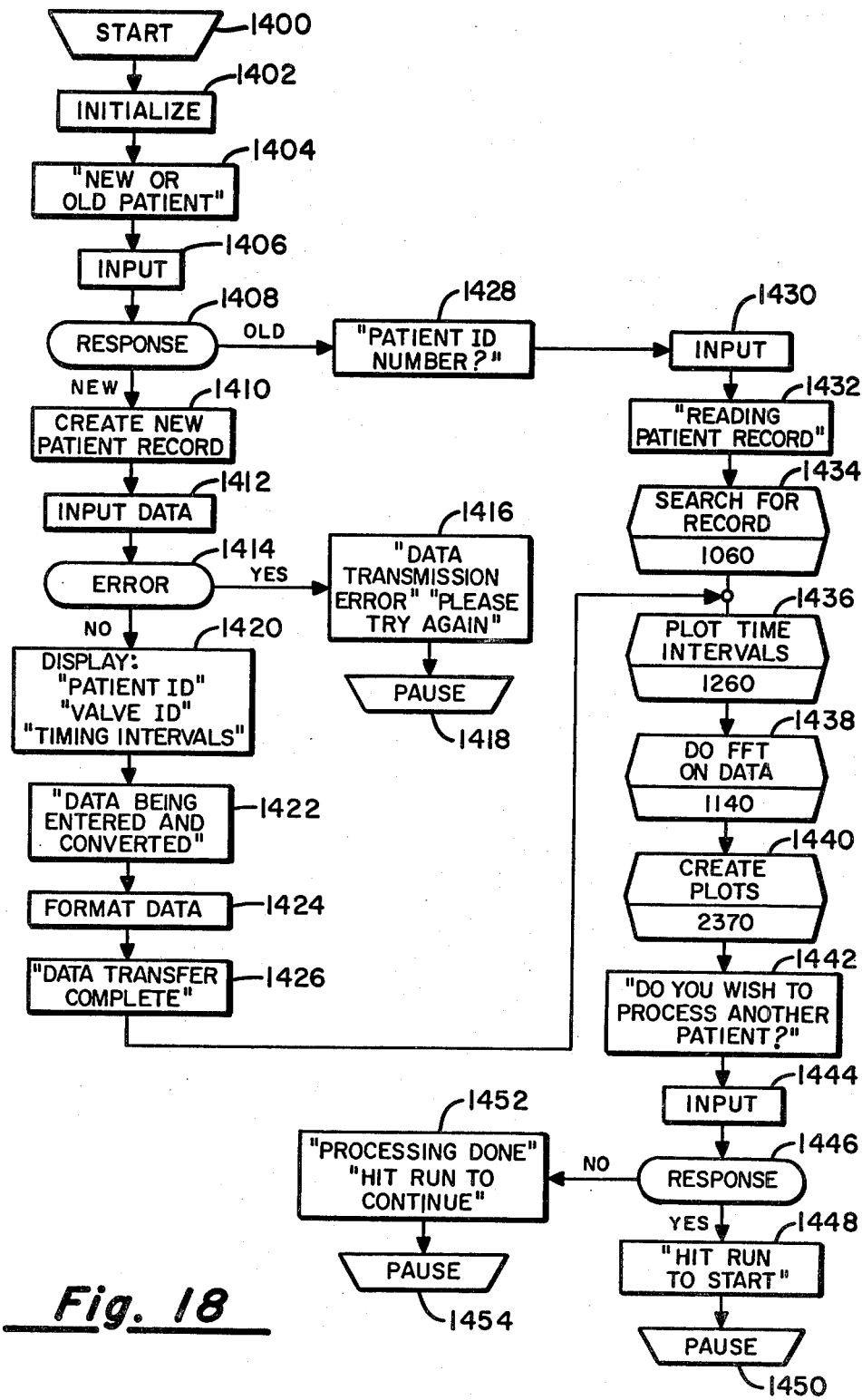
FIG. 18 is a flowchart for the software located within the central monitoring computer which performs the central monitoring and display functions.

FIG. 18 is a flowchart for the software implemented within the centralized monitoring site computer 70. As stated above, computer 70 is a Hewlett-Packard ® HP-85 computer, having its standard operating system. The various minor hardware options required to be ordered with the device are stated above. The program receives control from the executive at element 1400. Element 1402 initializes a number of variables. Element 1404 requests whether or not the input is to be a new patient. This query is presented through the normal operating system conventions on the display. Input is received at 1406.

The determinations is made at element 1408 whether or not the patient is a new or old patient. For a new patient, element 1410 is required to create a new patient record. The patient record is created in a standard format allowing the normal file-handling utilities of the HP-85 to be used for subsequent display and update of periodic monitoring information. Data is input at element 1412 and the element 1414 determines whether an error has been created. If an error has been experienced, element 1416 notifies the operator of a transmission error and asks him to try again. Element 1418 is a pause which causes a return to the executive mode awaiting a new executive command.

Assuming that no error in transmission was found, element 1420 displays the patient ID, valve ID and the various timing intervals measured. Element 1422 notifies the operator that data is being entered and converted and as an FFT is to be performed, a noticable amount of time is required. At element 1426, the operator has noted that the data transfer has been completed and control is given element 1436.

Assuming that the patient is an old patient, the new patient record need not be created. Therefore, control is given to element 1428 and the patient ID number is requested. Input is received via element 1430, and the opeator is notified at element 1432 that a patient record is being read. Element 1434 calls the subroutine at 1060 to search for the record.

Whether the present patient is a new patient or an old patient, the subroutine 1260 is called by element 1436 for the plotting of the time intervals. The time interval plot may be viewed again by reference to FIG. 2. Notice that the time interval plot is graph 112.

Referring again to FIG. 18, control is transferred to the subroutine 1140 by element 1436 to do a fast fourier transform of the data. As those of ordinary skill in the art are aware, the fast fourier transform takes the data that is digitized in the amplitude domain and converts it to the frequency domain. This has the effect of determining what are the components in frequency that make up the complex signal. Following the performance of the fast fourier transform, element 1440 creates the two plots by transferring control to the subroutine at 2370. By referring to FIG. 2, the two plots are seen. Graph 114 is a graph of amplitudes in the time domain showing the click signal 116. Notice that graph 114 is normalized such that the signal 116 varies about an arbitrary amplitude 0. The second graph to be plotted is graph 118. Notice that it displays information in the amplitude frequency plane as normalized to -36 db. As explained above, this is probably the most useful graph for the purpose as the theoretical references discussed above indicate that embolotic buildup can readily be determined by frequency shifts of certain frequency bands.

Referring again to FIG. 18, it can be seen that element 1442 queries the operator as to whether to process another patient. The input is received at element 1444. Element 1446 evaluates the response. If no additional patient process is requested, element 1452 indicates that the processing is completed, and element 1454 returns control to the executive program. If element 1446 determines that another patient file is to be processed, element 1448 indicates that a new run is about to start and control is returned to the executive at 1450.

The foregoing description along with the figures describe in detail the construction and use of a transtelephonic heart valve monitoring system. Those of ordinary skill in the art will be able to apply the present invention to different configurations consistent with this description.

What is claimed is:

1. Apparatus for transtelephonic monitoring of heart valve sounds comprising:
  a sensor for sensing heart valve sounds and for converting the heart valve sounds to an input signal;
  means responsively coupled to said sensor for windowing acoustic events in the input signal and for converting each acoustic event to a respective digital signal;
  means responsively coupled to said converting means for storing said digital signals;
  means responsively coupled to said storing means for transmitting said digital signals transtelephonically;
  means responsively coupled to said transmitting means for receiving said digital signals transtelephonically; and
  means responsively coupled to said sensing means and said storing means for timetagging each distal signal whereby said transmitting means may transmit each digital signal over an arbitrary time relative to the time required to said sensor to convert said physiological signal to said input signal and relative to other digital signals.

2. Apparatus according to claim 1 wherein said storing means is a digital memory.

3. Apparatus according to claim 2 wherein said digital memory is a random access memory.

4. Apparatus according to claim 3 wherein said receiving means further comprises processing means and display means.

5. Apparatus according to claim 4 wherein said processing means further comprises:
  means for transforming said digital signal from the time domain to the frequency domain.

6. Apparatus according to claim 5 wherein said display means further comprises:
  means responsively coupled to said transforming means for displaying said digital signal in both the time domain and frequency domain.

7. A method of transtelephonic monitoring of heart valve sounds comprising:
  (a) converting the heart valve sounds to an input signal;
  (b) windowing acoustic events on the input signal and converting the acoustic events to respective digital signals;
  (c) timetagging each digital signal;
  (d) storing said digital signals;
  (e) transtelephonically transmitting said digital signals at an arbitrary rate not dependent upon any temporal relation of the acoustic events; and
  (f) transtelephonically receiving said digital signals.

* * * * *

UNITED STATES PATENT AND TRADEMARK OFFICE
CERTIFICATE OF CORRECTION

PATENT NO. : 4,458,693
DATED : 10 July 1984
INVENTOR(S) : John D. Badzinski et al It is certified that error appears in the above-identified patent and that said Letters Patent are hereby corrected as shown below:

Column 2, line 42, "for" should be --or--;

Column 5, line 5, "aplitude" should be --amplitude--;

Column 12, line 33, delete the subscript "14" between "SHUT" and "BEEP";

line 59, delete the subscript "14" between "TIME" and "BUFFER";

line 63, delete the subscript "14" between "AD" and "GAIN";

Column 13, line 46, delete the subscript "14" between "BATT" and "LIFE";

Column 14, line 53, "Becuase" should be --Because--;

line 63, "as" should be --at--.

Signed and Sealed this

Eleventh Day of December 1984

[SEAL]

Attest:

GERALD J. MOSSINGHOFF

Attesting Officer  Commissioner of Patents and Trademarks